United States Patent
Morishita et al.

(10) Patent No.: US 8,236,417 B2
(45) Date of Patent: Aug. 7, 2012

(54) PRESSURE-SENSITIVE ADHESIVE FOR OPTICAL FILMS

(75) Inventors: Yoshihiro Morishita, Kamisu (JP); Kenichi Hamada, Kamisu (JP); Tetsuya Kunimune, Kamisu (JP); Kazushige Ishiura, Chiyoda-ku (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 455 days.

(21) Appl. No.: 12/312,916

(22) PCT Filed: Nov. 26, 2007

(86) PCT No.: PCT/JP2007/072728
§ 371 (c)(1),
(2), (4) Date: Jun. 1, 2009

(87) PCT Pub. No.: WO2008/065982
PCT Pub. Date: Jun. 5, 2008

(65) Prior Publication Data
US 2009/0305068 A1  Dec. 10, 2009

(30) Foreign Application Priority Data
Dec. 1, 2006  (JP) ................. 2006-325706

(51) Int. Cl.
C09J 7/00 (2006.01)
C08L 53/00 (2006.01)
(52) U.S. Cl. ....... 428/355 AC; 525/89; 525/94; 524/505
(58) Field of Classification Search .................... None
See application file for complete search history.

(56) References Cited

U.S. PATENT DOCUMENTS

| 5,668,231 | A | 9/1997 | Varshney et al. |
| 6,878,789 | B2 | 4/2005 | Uchiumi et al. |
| 2003/0096075 | A1 | 5/2003 | Dollase et al. |

FOREIGN PATENT DOCUMENTS

| EP | 1 686 163 A2 | 8/2006 |
| EP | 1 686 163 A3 | 8/2006 |
| JP | 6-93060 | 4/1994 |
| JP | 7-25859 | 3/1995 |
| JP | 7-82542 | 3/1995 |
| JP | 10-251609 A | 9/1998 |
| JP | 11-302617 | 11/1999 |
| JP | 11-323072 | 11/1999 |
| JP | 11-335432 | 12/1999 |
| JP | 2000-109771 A | 4/2000 |
| JP | 2003-329837 | 11/2003 |
| JP | 2004-58289 | 2/2004 |
| JP | 2005-307063 A | 11/2005 |
| JP | 2006-316181 A | 11/2006 |
| WO | WO 2006/023143 A1 | 3/2006 |

OTHER PUBLICATIONS

Machine translation of JP 2005-307063 A (Nov. 4, 2005).*
Machine translation of JP 11-323072 A (Nov. 26, 1999).*
Georges Moineau, et al., "Synthesis of fully acrylic thermoplastic elastomers by atom transfer radical polymerization (ATRP), 2a, Effect of the catalyst on the molecular control and the rheological properties of the triblock copolymers", Macromolecular Chemistry and Physics, vol. 201, No. 11, 2000, pp. 1108-1114.

* cited by examiner

Primary Examiner — James J Seidleck
Assistant Examiner — Vu A Nguyen
(74) Attorney, Agent, or Firm — Oblon, Spivak, McClelland, Maier & Neustadt, L.L.P.

(57) ABSTRACT

A pressure-sensitive adhesive contains an acrylic triblock copolymer (I) at not less than 60% by mass based on the total mass of all solids contained in the pressure-sensitive adhesive, the acrylic triblock copolymer being represented by the formula A1-B-A2 wherein: A1 and A2 are each independently an alkyl methacrylate polymer block having Tg of not less than 100° C. and B is an acryl acrylate polymer block having Tg of not more than −20° C.; the content of the polymer block B is 50 to 95% by mass; Mw is in the range of 50,000 to 300,000; and the molecular weight distribution is in the range of 1.0 to 1.5. Preferably, the acrylic triblock copolymer (I) is a combination of an acrylic triblock copolymer (Ia) having Mw of 50,000 to less than 100,000 and an acrylic triblock copolymer (Ib) having Mw of 100,000 to 300,000, in a mass ratio (Ia):(Ib) of 45:55 to 75:25.

17 Claims, No Drawings

PRESSURE-SENSITIVE ADHESIVE FOR OPTICAL FILMS

FIELD OF THE INVENTION

The present invention relates to pressure-sensitive adhesives for optical films that are suitably used to bond polarizing plates, retardation films or other optical films to adherends such as liquid crystal panels or are suitably used to attach protection films to optical films. The invention also relates to pressure-sensitive adhesive optical films and optical film-protection pressure-sensitive adhesive films that have a pressure-sensitive adhesive layer formed of the pressure-sensitive adhesive. The invention further relates to image display devices having the pressure-sensitive adhesive optical films and/or the optical film-protection pressure-sensitive adhesive films.

BACKGROUND OF THE INVENTION

Pressure-sensitive adhesives are used to bond optical films such as polarizing plates and retardation films to adherends such as liquid crystal panels, or to attach protection films to optical films. In the event of wrinkles, air trap, entrapment of foreign substances or misalignment, it is often necessary that the optical films or the protection films that are bonded are removed and re-bonded. Further, the optical films are removed to recover expensive liquid crystal panels for recycling. In view of these circumstances, pressure-sensitive adhesives for optical films that are used to bond optical films to adherends such as liquid crystal panels or to attach protection films to optical films, are required to be removed with appropriate peeling strength without adhesive transfer and are also required to have re-workability so that they can effect bonding even after removed.

Furthermore, it is necessary that pressure-sensitive adhesives for optical films have high durability such that they are not expanded or do not separate from adherends even when exposed to high temperatures or wet and hot conditions.

Various pressure-sensitive adhesives for optical films have been disclosed. (1) Patent Document 1 discloses pressure-sensitive adhesives for polarizing plates or retardation films that comprise a graft copolymer or a block copolymer which includes a high-Tg polymer segment having a glass transition temperature (Tg) of not less than 50° C. and a molecular weight of 500 to 1,000,000 and a low-Tg polymer segment having Tg lower than that of the high-Tg polymer segment by 70° C. or more wherein the molecular weight of the copolymer ranges from 400,000 to 2,000,000. (2) Patent Document 2 describes pressure-sensitive adhesives for optical films that contain 100 parts by weight of an acrylic polymer with a weight average molecular weight of not less than 1,000,000 and 1 to 40 parts by weight of an acrylic oligomer with a glass transition temperature of not more than −5° C. and a weight average molecular weight of 800 to 50,000. (3) Patent Document 3 discloses pressure-sensitive adhesives for optical films that comprise an acrylic-based polymer as a base material preferably having a weight average molecular weight of not less than 1,000,000 and an acrylic oligomer comprising a block copolymer which has a polymer block with a glass transition temperature thereof alone of not more than −5° C.

However, the working examples of Patent Document 1 only describe pressure-sensitive adhesives that are composed of a graft copolymer having a high-Tg polystyrene segment as a branch and a butyl acrylate polymer segment as a main chain. According to Patent Document 1, chemical crosslinking treatment is required in order that the pressure-sensitive adhesives show adhesive properties. For the crosslinking, functional groups such as hydroxyl groups and carboxyl groups are introduced in advance in the low-Tg polymer segment (backbone) constituting the graft copolymer that is the base material of the pressure-sensitive adhesive. The chemical crosslinking is achieved by adding a crosslinking agent (e.g., "Coronate L", a trifunctional isocyanate compound) to a solution of the pressure-sensitive adhesive at the stage of the application of the pressure-sensitive adhesive. Accordingly, the chemical crosslinking of the pressure-sensitive adhesives disclosed in Patent Document 1 adds a post-treatment step in the production of pressure-sensitive adhesive optical films to lower productivity. Furthermore, bonding performance tends to vary due to uneven crosslinking.

In regard to the pressure-sensitive adhesives of Patent Documents 2 and 3, the acrylic polymers that are the base materials of the pressure-sensitive adhesives have a very high weight average molecular weight of 1,000,000 or more, resulting in high solution viscosity. To obtain pressure-sensitive adhesive solutions having low viscosity and high application properties, it is necessary that large amounts of organic solvents are used to lower the solid concentration in the pressure-sensitive adhesive solutions. The use of large amounts of organic solvents causes problems in terms of environmental pollution and extended time required to remove the solvents after application. Similar to the pressure-sensitive adhesives disclosed in Patent Document 1, Patent Documents 2 and 3 entail that functional groups such as carboxyl groups are introduced in advance in the acrylic polymers that are the base materials of the pressure-sensitive adhesive so that crosslinks may be formed and adhesive properties may be achieved by reaction with a crosslinking agent (e.g., "Coronate L", a trifunctional isocyanate compound). The chemical crosslinking is achieved by adding a crosslinking agent to a solution of the pressure-sensitive adhesive at the application of the pressure-sensitive adhesive. Accordingly, the chemical crosslinking adds a post-treatment step in the production of pressure-sensitive adhesive optical films to lower productivity. Furthermore, bonding performance tends to vary due to uneven crosslinking.

Meanwhile, hot-melt pressure-sensitive adhesives containing acrylic triblock copolymers are known (Patent Documents 4 and 5). These documents, however, do not describe that the hot-melt pressure-sensitive adhesives are used for optical films nor that instead of being molten, the hot-melt pressure-sensitive adhesives are dissolved in organic solvents and the resultant pressure-sensitive adhesive solutions are used for optical films.

Patent Document 1: JP-A-H07-82542
Patent Document 2: JP-A-2003-329837
Patent Document 3: JP-A-2004-58289
Patent Document 4: JP-A-H11-302617
Patent Document 5: JP-A-H11-323072
Patent Document 6: JP-A-H06-93060
Patent Document 7: JP-B-H07-25859
Patent Document 8: JP-A-H11-335432
Non-Patent Document 1: Macromol. Chem. Phys., 2000, vol. 201, pp. 1108-1114

SUMMARY OF THE INVENTION

It is an object of the invention to provide pressure-sensitive adhesives for optical films which can bond optical films to adherends or can attach protection films to optical films and can be removed with appropriate peeling strength without adhesive transfer and have excellent re-workability and further which have high durability such that the pressure-sensitive adhesives do not reduce adhesion or are not expanded even when exposed to high temperatures or wet and hot conditions, thereby maintaining superior adhesive properties over long periods.

It is another object of the invention that the pressure-sensitive adhesives for optical films do not require chemical crosslinking treatment and enable efficient production of pressure-sensitive adhesive optical films having excellent bonding performance and durability without chemical crosslinking.

It is a still another object of the invention to provide pressure-sensitive adhesive solutions for optical films wherein pressure-sensitive adhesives are dissolved in organic solvents while ensuring low solution viscosity whereby the amounts of organic solvents are reduced and excellent application properties and handling properties are obtained.

It is another object of the invention to provide pressure-sensitive adhesive optical films and optical film-protection pressure-sensitive adhesive films that have a pressure-sensitive adhesive layer formed of the foregoing pressure-sensitive adhesive. It is a further object to provide image display devices having the pressure-sensitive adhesive optical films and/or the optical film-protection pressure-sensitive adhesive films.

The present inventors have studied diligently to achieve the above objects. They have then invented pressure-sensitive adhesives for optical films that comprise a specific acrylic triblock copolymer, in detail, an acrylic triblock copolymer which contains an acryl acrylate polymer central block having a glass transition temperature of not more than −20° C. and in which the central block is terminated at both ends with an acryl methacrylate polymer having a glass transition temperature of not less than 100° C. and in which the weight average molecular weight (Mw) ranges from 50,000 to 300,000, the molecular weight distribution (Mw/Mn) ranges from 1.0 to 1.5 and the content of the acryl acrylate polymer central block is in the range of 50 to 95% by mass. The pressure-sensitive adhesives for optical films have been shown to achieve excellent properties such as re-workability, adhesive properties, heat resistance and durability without chemical crosslinking treatment.

The present inventors have also found that solutions of the specific acrylic triblock copolymers in organic solvents have low solution viscosity even at high concentrations whereby the pressure-sensitive adhesives containing the acrylic triblock copolymers achieve good storage stability and can be applied to substrates with good handling properties. It has been also found that the pressure-sensitive adhesives for optical films may be applied to substrates while using reduced amounts of organic solvents in the production of the pressure-sensitive adhesives, thereby reducing the environment pollution and the burden on the removal of the solvents after application.

The inventors have also found the when the acrylic triblock copolymers contain in a specific mass ratio an acrylic triblock copolymer with a weight average molecular weight (Mw) of 50,000 to less than 100,000 and an acrylic triblock copolymer with a weight average molecular weight (Mw) of 100,000 to 300,000, the adhesive properties (e.g., adhesion, creep) and bulk properties (e.g., dynamic viscoelasticity) of the obtainable pressure-sensitive adhesives for optical films may be controlled to desired levels more easily and more smoothly, and the pressure-sensitive adhesives show enhanced re-workability and durability.

The present inventors have also found that the re-workability of the pressure-sensitive adhesives may be further improved by using the specific acrylic triblock copolymer together with a specific amount of a specific acrylic diblock copolymer, in detail, a diblock copolymer in which one alkyl methacrylate polymer block and one alkyl acrylate polymer block are joined together and which has a weight average molecular weight (Mw) of 50,000 to 300,000, a molecular weight distribution (Mw/Mn) of 1.0 to 1.5 and a content of the alkyl acrylate polymer block of 50 to 95% by mass.

The inventors have further found that pressure-sensitive adhesives having a specific range of storage elastic modulus show increased capability to follow changes such as deformation, swelling and shrinkage of substrates or adherends, whereby the pressure-sensitive adhesives cause only small stress to substrates or adherends and ensure bond strength and durability stably over long periods. The present invention has been completed based on these findings.

(1) An aspect of the present invention is directed to a non-chemical crosslinking pressure-sensitive adhesive for optical films that comprises an acrylic triblock copolymer (I) at not less than 60% by mass based on the total mass of all the solids contained in the pressure-sensitive adhesive, the acrylic triblock copolymer meeting the following requirements (E1), (E2), (E3) and (E4):

acrylic triblock copolymer (I):

(E1) the acrylic triblock copolymer is represented by Formula (1) below:

$$A1\text{-}B\text{-}A2 \qquad (1).$$

wherein A1 and A2 are each independently an alkyl methacrylate polymer block having a glass transition temperature of not less than 100° C. and B is an alkyl acrylate polymer block having a glass transition temperature of not more than −20° C.;

(E2) the content of the polymer block B is 50 to 95% by mass;

(E3) the weight average molecular weight (Mw) is in the range of 50,000 to 300,000; and (E4) the molecular weight distribution (Mw/Mn) is in the range of 1.0 to 1.5.

(2) In an embodiment of the pressure-sensitive adhesive described in (1), the acrylic triblock copolymer (I) is a combination comprising an acrylic triblock copolymer (Ia) and an acrylic triblock copolymer (Ib) in a mass ratio (Ia):(Ib) of 45:55 to 75:25, the acrylic triblock copolymer (Ia) meeting the following requirements (E1), (E2), (E3') and (E4), the acrylic triblock copolymer (Ib) meeting the following requirements (E1), (E2), (E3") and (E4):

acrylic triblock copolymer (Ia):

(E1) the acrylic triblock copolymer is represented by Formula (1) below:

$$A1\text{-}B\text{-}A2 \qquad (1)$$

wherein A1 and A2 are each independently an alkyl methacrylate polymer block having a glass transition temperature of not less than 100° C. and B is an alkyl acrylate polymer block having a glass transition temperature of not more than −20° C.;

(E2) the content of the polymer block B is 50 to 95% by mass;

(E3') the weight average molecular weight (Mw) is in the range of 50,000 to less than 100,000; and (E4) the molecular weight distribution (Mw/Mn) is in the range of 1.0 to 1.5;

acrylic triblock copolymer (Ib):

(E1) the acrylic triblock copolymer is represented by Formula (1) below:

$$A1\text{-}B\text{-}A2 \qquad (1)$$

wherein A1 and A2 are each independently an alkyl methacrylate polymer block having a glass transition temperature of not less than 100° C. and B is an alkyl acrylate polymer block having a glass transition temperature of not more than −20° C.;

(E2) the content of the polymer block B is 50 to 95% by mass;

(E3") the weight average molecular weight (Mw) is in the range of 100,000 to 300,000; and (E4) the molecular weight distribution (Mw/Mn) is in the range of 1.0 to 1.5.

(3) In an embodiment of the pressure-sensitive adhesive for optical films described in (2), the weight average molecular weight (Mw) of the acrylic triblock copolymer (Ib) is in the range of 100,000 to 200,000.

(4) In an embodiment of the pressure-sensitive adhesive for optical films described in (2) or (3), the content of the polymer block B in the acrylic triblock copolymer (Ia) is 50 to 70% by mass and the content of the polymer block B in the acrylic triblock copolymer (Ib) is 65 to 95% by mass.

(5) In an embodiment of the pressure-sensitive adhesive for optical films described in any one of (2) to (4), the acrylic triblock copolymer (Ib) is a combination comprising an acrylic triblock copolymer (Ib-1) and an acrylic triblock copolymer (Ib-2) in a mass ratio (Ib-1):(Ib-2) of 10:90 to 90:10, the acrylic triblock copolymer (Ib-1) meeting the foregoing requirements (E1), (E2) and (E4) and having a weight average molecular weight (Mw) of 100,000 to less than 120,000, the acrylic triblock copolymer (Ib-2) meeting the foregoing requirements (E1), (E2) and (E4) and having a weight average molecular weight (Mw) of 120,000 to 200,000.

(6) In an embodiment of the pressure-sensitive adhesive for optical films described in any one of (1) to (5), the alkyl methacrylate polymer blocks forming the acrylic triblock copolymer (I), the acrylic triblock copolymer (Ia), the acrylic triblock copolymer (Ib), the acrylic triblock copolymer (Ib-1) or the acrylic triblock copolymer (Ib-2) have a syndiotacticity of not less than 65%.

(7) In an embodiment of the pressure-sensitive adhesive for optical films described in any one of (1) to (6), the pressure-sensitive adhesive further comprises an acrylic diblock copolymer (II) at 3 to 25% by mass based on the total mass of all the solids contained in the pressure-sensitive adhesive, the acrylic diblock copolymer meeting the following requirements (F1), (F2), (F3) and (F4) acrylic diblock copolymer (II)

(F1) the acrylic diblock copolymer is represented by Formula (2) below:

$$C\text{-}D \qquad (2)$$

wherein C is an alkyl methacrylate polymer block and D is an alkyl acrylate polymer block;

(F2) the content of the polymer block D is 50 to 95% by mass;

(F3) the weight average molecular weight (Mw) is in the range of 50,000 to 300,000; and (F4) the molecular weight distribution (Mw/Mn) is in the range of 1.0 to 1.5.

(8) In an embodiment of the pressure-sensitive adhesive for optical films described in any one of (1) to (7), when the dynamic viscoelasticity of the pressure-sensitive adhesive is measured at a frequency of 6.28 rad/s, the storage elastic modulus at 23° C. [G' (23° C.)] is in the range of $1.0 \times 10^5$ to $8.0 \times 10^5$ Pa and the storage elastic modulus at 90° C. [G' (90° C.)] is in the range of $7.0 \times 10^4$ to $6.0 \times 10^5$ Pa.

(9) In an embodiment of the pressure-sensitive adhesive for optical films described in any one of (1) to (8), the pressure-sensitive adhesive is a pressure-sensitive adhesive solution dissolved in an organic solvent.

(10) In an embodiment of the pressure-sensitive adhesive for optical films described in any one of (1) to (9), a solution of the pressure-sensitive adhesive in toluene with a solid concentration of 45% by mass has a solution viscosity of 1000 to 4000 mPa·s as measured with Brookfield viscometer at 25° C.

(11) Another aspect of the invention is directed to a pressure-sensitive adhesive optical film or an optical film-protection pressure-sensitive adhesive film that comprises a pressure-sensitive adhesive layer formed from the pressure-sensitive adhesive of any one of (1) to (10) and is produced without a crosslinking step.

(12) A still another aspect of the invention is directed to an image display device having the pressure-sensitive adhesive optical film and/or the optical film-protection pressure-sensitive adhesive film described in (11).

ADVANTAGES OF THE INVENTION

The pressure-sensitive adhesives for optical films that are based on the acrylic triblock copolymer (I) meeting the requirements (E1) to (E4) do not require chemical crosslinking. Even without chemical crosslinking, the pressure-sensitive adhesives exhibit high cohesion and excellent properties such as re-workability, adhesion properties, heat resistance and durability. Accordingly, pressure-sensitive adhesive optical films and optical film-protection pressure-sensitive adhesive films may be manufactured eliminating a crosslinking step, with excellent process advantages and productivity.

Because the pressure-sensitive adhesives of the invention do not undergo chemical crosslinking, solutions of the pressure-sensitive adhesives exhibit excellent storage stability in contrast to conventional chemical crosslinking pressure-sensitive adhesives for optical films. Furthermore, the pressure-sensitive adhesives of the invention are free from problems that uneven crosslinking is caused by conditions in a drying step or during storage (e.g., temperature, air volume, line speed, storage period) to vary the bonding performance. The pressure-sensitive adhesives of the present invention have uniform and superior adhesive properties.

The pressure-sensitive adhesives for optical films that are based on the specific acrylic triblock copolymer (I) can be dissolved in organic solvents at high concentrations while still ensuring low solution viscosity. Therefore, the pressure-sensitive adhesive solutions can have a higher solid concentration (not less than 35% by mass) than heretofore possible while the usage amount of organic solvents is reduced. The pressure-sensitive adhesive solutions of high solid concentration provide process advantages such as excellent handling properties during application and an increased line speed.

The decreased use of organic solvents reduces deterioration of work environment and environmental pollution by the organic solvents. Furthermore, the time and heat energy required to remove the solvents after application may be reduced.

The pressure-sensitive adhesive solutions of high solid concentration enable reduction in transportation costs and number of times of preparation in tank, improving productivity.

According to an embodiment of the invention, the acrylic triblock copolymer (I) may be a combination in the specific mass ratio of the acrylic triblock copolymer (Ia) meeting the foregoing requirements (E1), (E2) and (E4) and having a weight average molecular weight (Mw) of 50,000 to less than 100,000 and the acrylic triblock copolymer (Ib) meeting the foregoing requirements (E1), (E2) and (E4) and having a weight average molecular weight (Mw) of 100,000 to 300,000. The pressure-sensitive adhesives for optical films that contain such acrylic triblock copolymers may be more easily and more smoothly controlled in properties such as adhesive properties (e.g., adhesion, creep) and bulk properties (e.g., dynamic viscoelasticity) to desired levels. Furthermore, such pressure-sensitive adhesives exhibit higher durability and smaller temporal changes in adhesion and ensure excellent re-workability even after long heating.

The pressure-sensitive adhesives for optical films containing the acrylic triblock copolymer (I) may further contain the specific acrylic diblock copolymer (II) meeting the foregoing requirements (F1) to (F4) at 3 to 25% by mass based on the total mass of all the solids contained in the pressure-sensitive adhesive. Such pressure-sensitive adhesives have excellent wetting properties with respect to adherends, small temporal changes in adhesion, and excellent re-workability.

According to an embodiment of the invention, the pressure-sensitive adhesives that are tested for dynamic viscoelasticity at a frequency of 6.28 rad/s have a storage elastic modulus at 23° C. [G' (23° C.)] in the range of $1.0 \times 10^5$ to $8.0 \times 10^5$ Pa and a storage elastic modulus at 90° C. [G' (90° C.)] in the range of $7.0 \times 10^4$ to $6.0 \times 10^5$ Pa. Such pressure-sensitive adhesives show good followability to changes such as deformation, swelling and shrinkage of substrates or adherends, whereby the pressure-sensitive adhesives cause only small stress to substrates or adherends and ensure bond strength and durability stably over long periods.

PREFERRED EMBODIMENTS OF THE INVENTION

The present invention will be described in detail hereinbelow.

The present invention is concerned with pressure-sensitive adhesives for optical films.

As used herein, the words "pressure-sensitive adhesives for optical films" are collective terms of pressure-sensitive adhesives used to form a pressure-sensitive adhesive layer on a part or the whole of one or both surfaces of various kinds of optical films in order to bond the optical films to adherends (such optical films include, but are not limited to, polarizing films, polarizing plates, retardation films, view angle enlarging films, brightness increasing films, antireflection films, anti-glare films, color filters, light guide plates, diffusion films, prism sheets, electromagnetic wave shielding films, near infrared absorption films, and functional composite optical films having plural optical functions) and pressure-sensitive adhesives used to attach protection films to the surface of the optical films.

The acrylic triblock copolymers (I) used in the pressure-sensitive adhesives for optical films according to the present invention satisfy the following requirements (E1) to (E4):

(E1) The acrylic triblock copolymer is represented by Formula (1) below:

A1-B-A2    (1)

wherein A1 and A2 are each independently an alkyl methacrylate polymer block having a glass transition temperature of not less than 100° C. and B is an alkyl acrylate polymer block having a glass transition temperature of not more than −20° C.

(E2) The weight average molecular weight (Mw) is in the range of 50,000 to 300,000.

(E3) The molecular weight distribution (Mw/Mn) is in the range of 1.0 to 1.5.

(E4) The content of the polymer block B is 50 to 95% by mass.

The acrylic triblock copolymers (I) that are the base materials of the pressure-sensitive adhesives of the invention have the formula A1-B-A2 in which an alkyl acrylate polymer block B is joined between two alkyl methacrylate polymer blocks A1 and A2 (Requirement (E1)).

The two polymer blocks A1 and A2 in the acrylic triblock copolymers (I) are each an alkyl methacrylate polymer having a glass transition temperature of not less than 100° C. The polymer blocks A1 and A2 that are alkyl methacrylate polymers having a glass transition temperature of not less than 100° C. work as constraint phases (physical pseudo crosslinking sites) in the acrylic triblock copolymer (I) that forms a microphase separated structure at usual service temperatures of pressure-sensitive adhesives. The pressure-sensitive adhesives for optical films of the present invention do not require crosslinking agents unlike the pressure-sensitive adhesives disclosed in Patent Documents 1 to 3 wherein the adhesion is achieved by chemical crosslinking. Even without chemical crosslinking, the pressure-sensitive adhesives exhibit sufficient cohesion and excellent adhesion properties and durability.

From the viewpoints of durability, heat resistance, followability to deformation of substrates and moderate stress-relaxation properties, the alkyl methacrylate polymer blocks A1 and A2 in the acrylic triblock copolymers (I) preferably have a glass transition temperature of 100 to 200° C., and particularly 100 to 150° C.

In the acrylic triblock copolymers (I), the two polymer blocks A1 and A2 may be the same polymers (identical alkyl methacrylate polymers having the same molecular weight, monomer composition and conformation (e.g., syndiotacticity)) or differing polymers (alkyl methacrylate polymers having one or more differing properties such as molecular weight, monomer composition and conformation (e.g., syndiotacticity)), as long as they are alkyl methacrylate polymer blocks having a glass transition temperature of not less than 100° C.

Examples of the alkyl methacrylate units constituting the polymer blocks A1 and A2 include alkyl methacrylate units such as methyl methacrylate, ethylmethacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate and isobornyl methacrylate. Each of the polymer blocks A1 and A2 may be composed of a single or two or more kinds of the alkyl methacrylate units.

In particular, it is preferable that the polymer blocks A1 and A2 contain poly(methyl methacrylate) because methyl methacrylate that is raw material is easily obtained at low costs and poly(methyl methacrylate) possesses excellent durability and weather resistance.

The polymer block B constituting the acrylic triblock copolymer (I) is an alkyl acrylate polymer block having a glass transition temperature of not more than −20° C. As long as this condition is met, the alkyl acrylate units and monomer composition of the polymer block B are not particularly limited.

The polymer block B having a glass transition temperature of not more than −20° C. imparts excellent flexibility and wetting properties to the acrylic triblock copolymer (I) that forms a microphase separated structure at usual service temperatures. Consequently, the pressure-sensitive adhesives for optical films (hereinafter, also referred to as the pressure-sensitive adhesives of the invention or simply the pressure-sensitive adhesives) exhibit appropriate adhesion and good re-workability.

In particular, it is preferable that the alkyl acrylate polymer block B has a glass transition temperature of not more than −30° C., and particularly in the range of −40 to −80° C., in which case excellent durability at low temperatures may be obtained.

Examples of the alkyl acrylate units constituting the polymer block B include alkyl acrylate units such as methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate and stearyl acrylate. The polymer block B may be composed of a single or two or more kinds of the alkyl acrylate units.

It is particularly preferable that the polymer block B is composed of a single or two or more kinds of propyl acrylate, n-butyl acrylate, 2-ethylhexyl acrylate and n-octyl acrylate units. In this case, the glass transition temperature of the polymer block B is not more than −20° C. and the pressure-sensitive adhesives show good adhesion and tackiness at low temperatures and permit high-speed peeling without zipping phenomena.

In particular, the polymer block B is preferably composed of a n-butyl acrylate unit and/or a 2-ethylhexyl acrylate unit because n-butyl acrylate and 2-ethylhexyl acrylate are general inexpensive chemicals. Furthermore, the polymer block B in this case has distinct phase separation from the polymer blocks A and the pseudo crosslinking sites of the polymer blocks A are not broken, and the pressure-sensitive adhesives show high cohesion and high durability.

The polymer blocks A1 and A2 and the polymer block B constituting the acrylic triblock copolymer (I) may contain small amounts of other monomer units (generally not more than 10% by mass based on the mass of each polymer block) while still achieving the advantages of the invention. Examples of the monomer units which may be found in the polymer blocks A1, A2 and B include units composed of (meth)acrylates having functional groups such as methoxyethyl(meth)acrylate (i.e., methoxyethyl acrylate or methoxyethyl methacrylate, the same applies hereinafter), ethoxyethyl(meth)acrylate, diethylaminoethyl(meth)acrylate, 2-hydroxyethyl (meth)acrylate, 2-aminoethyl(meth)acrylate, glycidyl (meth)acrylate and tetrahydrofurfuryl(meth)acrylate; units composed of carboxyvinyl monomers such as (meth)acrylic acid, crotonic acid, maleic acid, maleic anhydride, fumaric acid and (meth) acrylamide; units composed of aromatic vinyl monomers such as styrene, α-methylstyrene and p-methylstyrene; units composed of conjugated diene monomers such as butadiene and isoprene; units composed of olefin monomers such as ethylene and propylene; and units composed of lactone monomers such as ε-caprolactone and valerolactone. The polymer blocks may contain a single or two or more kinds of these monomer units as required.

The acrylic triblock copolymer (I) contains the polymer block B at 50 to 95% by mass (Requirement (E2)), preferably 60 to 85% by mass, and more preferably 65 to 80% by mass based on the mass of the acrylic triblock copolymer (I).

This proportion of the polymer block B in the acrylic triblock copolymer (I) leads to stable adhesion of the pressure-sensitive adhesives.

If the proportion of the polymer block B in the acrylic triblock copolymer (I) is less than 50% by mass, the adhesion of the obtainable pressure-sensitive adhesives is lowered. If the proportion exceeds 95% by mass, the proportion of the polymer blocks A1 and A2 that provide pseudo crosslinking sites is relatively reduced to cause lower cohesion, resulting in deteriorated durability of the pressure-sensitive adhesives.

The weight average molecular weight (Mw) of the acrylic triblock copolymer (I) is in the range of 50,000 to 300,000 (Requirement (E3)). From the viewpoints of durability and re-workability, the weight average molecular weight is preferably in the range of 60,000 to 250,000, and more preferably 70,000 to 200,000.

If the weight average molecular weight (Mw) of the acrylic triblock copolymer (I) is less than 50,000, the cohesion of the pressure-sensitive adhesives is insufficient to cause deteriorated durability such that optical films bonded to adherends, or protection films attached to optical films through the pressure-sensitive adhesives are easily separated. If the weight average molecular weight (Mw) of the acrylic triblock copolymer (I) is more than 300,000, the adhesion is gradually increased during, for example, storage of products. Consequently, re-workability is deteriorated to make it difficult to remove and re-bond optical films or protection films in the event of wrinkles, air trap, entrapment of foreign substances or misalignment. Moreover, if the weight average molecular weight (Mw) of the acrylic triblock copolymer (I) is more than 300,000, the solution viscosity is so increased that application of high-concentration solutions is infeasible and increased amounts of solvents are required.

The molecular weight distribution (Mw/Mn) of the acrylic triblock copolymer (I) is in the range of 1.0 to 1.5 (Requirement (E4)). To achieve higher cohesion and increased durability of the pressure-sensitive adhesives at high temperatures, the molecular weight distribution (Mw/Mn) is preferably in the range of 1.0 to 1.4, and more preferably 1.0 to 1.3.

If the molecular weight distribution (Mw/Mn) of the acrylic triblock copolymer (I) exceeds 1.5, the influence of low-molecular weight components is not negligible and problems such as lower cohesion or adhesive transfer in the re-working tend to be caused.

The weight average molecular weight (Mw), number average molecular weight (Mn) and molecular weight distribution (Mw/Mn) of the acrylic triblock copolymers and acrylic diblock copolymers described later are measured by a method described in the working examples of the present invention.

The acrylic triblock copolymers (I) that are the base materials of the pressure-sensitive adhesives of the invention may comprise a single acrylic triblock copolymer satisfying the requirements (E1) to (E4) or may comprise two, three or more kinds of acrylic triblock copolymers satisfying the requirements (E1) to (E4).

In the pressure-sensitive adhesives of the present invention, the acrylic triblock copolymer (I) that is base material may be a combination of an acrylic triblock copolymer (Ia) and an acrylic triblock copolymer (Ib) in a mass ratio (Ia):(Ib) of 45:55 to 75:25, preferably 50:50 to 70:30, and more preferably 60:40 to 70:30. The acrylic triblock copolymer (Ia) meets the following requirements (E1), (E2), (E3') and (E4), and the acrylic triblock copolymer (Ib) meets the following requirements (E1), (E2), (E3") and (E4). The pressure-sensitive adhesives according to this embodiment may be more easily and more smoothly controlled in properties such as adhesive properties (e.g., adhesion, creep) and bulk properties (e.g., dynamic viscoelasticity) to desired levels. Furthermore, such pressure-sensitive adhesives exhibit higher durability and re-workability.

Acrylic triblock copolymer (Ia):

(E1) The acrylic triblock copolymer is represented by Formula (1) below:

$$A1-B-A2 \quad (1)$$

wherein A1 and A2 are each independently an alkyl methacrylate polymer block having a glass transition temperature of not less than 100° C. and B is an alkyl acrylate polymer block having a glass transition temperature of not more than −20° C.

(E2) The content of the polymer block B is 50 to 95% by mass.

(E3') The weight average molecular weight (Mw) is in the range of 50,000 to less than 100,000.

(E4) The molecular weight distribution (Mw/Mn) is in the range of 1.0 to 1.5.

Acrylic triblock copolymer (Ib):

(E1) The acrylic triblock copolymer is represented by Formula (1) below:

$$A1-B-A2 \quad (1)$$

wherein A1 and A2 are each independently an alkyl methacrylate polymer block having a glass transition temperature of not less than 100° C. and B is an alkyl acrylate polymer block having a glass transition temperature of not more than −20° C.

(E2) The content of the polymer block B is 50 to 95% by mass.

(E3") The weight average molecular weight (Mw) is in the range of 100,000 to 300,000.

(E4) The molecular weight distribution (Mw/Mn) is in the range of 1.0 to 1.5.

In a preferred embodiment of the acrylic triblock copolymer (I) that is a combination of the acrylic triblock copolymer (Ia) and the acrylic triblock copolymer (Ib), the acrylic triblock copolymer (Ia) meets the requirements (E1), (E2) and (E4) and has a weight average molecular weight (Mw) of 50,000 to 90,000, more preferably 55,000 to 85,000, and particularly preferably 60,000 to 75,000, and the acrylic triblock copolymer (Ib) meets the requirements (E1), (E2) and (E4) and has a weight average molecular weight (Mw) of 100,000 to 200,000, more preferably 105,000 to 190,000, and particularly preferably 110,000 to 180,000. According to this preferred embodiment, the pressure-sensitive adhesives exhibit improved durability, re-workability, and followability to swelling or shrinkage of optical films by temperature or humidity.

In an embodiment of the acrylic triblock copolymer (I) that is a combination of the acrylic triblock copolymer (Ia) and the acrylic triblock copolymer (Ib), the content of the polymer block B in the acrylic triblock copolymer (Ia) is 50 to 70% by mass and the content of the polymer block B in the acrylic triblock copolymer (Ib) is 65 to 95% by mass. According to this embodiment, the molecular weights are similar among the polymer blocks A1 and A2 of the acrylic triblock copolymer (Ia) and the polymer blocks A1 and A2 of the acrylic triblock copolymer (Ib), so that these polymer blocks responsible for the physical crosslinking of the acrylic triblock copolymer (Ia) and the acrylic triblock copolymer (Ib) achieve increased compatibility with each other. The physical crosslinking of the acrylic triblock copolymer (Ia) and the acrylic triblock copolymer (Ib) forms a network structure and provides further increased durability of the pressure-sensitive adhesives.

In an embodiment of the acrylic triblock copolymer (I) that is a combination of the acrylic triblock copolymer (Ia) and the acrylic triblock copolymer (Ib), the acrylic triblock copolymer (Ib) is a mixture of an acrylic triblock copolymer (Ib-1) meeting the foregoing requirements (E1), (E2) and (E4) and having a weight average molecular weight (Mw) of 100,000 to less than 120,000 and an acrylic triblock copolymer (Ib-2) meeting the foregoing requirements (E1), (E2) and (E4) and having a weight average molecular weight (Mw) of 120,000 to 200,000; and the acrylic triblock copolymer (Ib-1):acrylic triblock copolymer (Ib-2) mass ratio is 10:90 to 90:10, preferably 50:50 to 90:10, and more preferably 60:40 to 80:20. The pressure-sensitive adhesives for optical films according to this embodiment may be more easily and more smoothly controlled in properties such as adhesive properties (e.g., adhesion, creep) and bulk properties (e.g., dynamic viscoelasticity) to desired levels. Furthermore, such pressure-sensitive adhesives exhibit higher durability and re-workability and can be applied at high concentrations, whereby the usage amounts of solvents may be reduced.

In the acrylic triblock copolymers (I), (Ia), (Ib), (Ib-1) or (Ib-2), the alkyl methacrylate polymer blocks forming the triblock copolymer preferably have a syndiotacticity of not less than 65%, and more preferably in the range of 70 to 95%. When the syndiotacticity of the polymer blocks is 65% or more, the obtainable pressure-sensitive adhesives show good durability (durability of adhesion properties).

It is necessary that the pressure-sensitive adhesives of the invention contain the acrylic triblock copolymer (I) at not less than 60% by mass, preferably 75% by mass, and more preferably not less than 80% by mass based on the total mass of all the solids contained in the pressure-sensitive adhesive. (When the acrylic triblock copolymer (I) is a combination of the acrylic triblock copolymer (Ia) and the acrylic triblock copolymer (Ib), the above proportion represents the total of these two copolymers.)

If the proportion of the acrylic triblock copolymer (I) is less than 60% by mass based on the total mass of all the solids contained in the pressure-sensitive adhesive, the cohesion is lowered to deteriorate durability (durability of adhesion properties) of the pressure-sensitive adhesives.

Where necessary, the pressure-sensitive adhesives of the invention may contain an acrylic diblock copolymer (II) meeting the following requirements (F1), (F2), (F3) and (F4) in addition to the acrylic triblock copolymer (I).

Acrylic diblock copolymer (II):

(F1) The acrylic diblock copolymer is represented by Formula (2) below:

$$C-D \quad (2)$$

wherein C is an alkyl methacrylate polymer block and D is an alkyl acrylate polymer block.

(F2) The content of the polymer block D is 50 to 95% by mass.

(F3) The weight average molecular weight (Mw) is in the range of 50,000 to 300,000.

(F4) The molecular weight distribution (Mw/Mn) is in the range of 1.0 to 1.5.

In the pressure-sensitive adhesives containing the acrylic triblock copolymer (I) and the acrylic diblock copolymer (II), the content of the acrylic diblock copolymer (II) is preferably 3 to 25% by mass, and more preferably 3 to 20% by mass based on the total mass of all the solids contained in the pressure-sensitive adhesive.

The pressure-sensitive adhesives containing the acrylic diblock copolymer (II) in the above amount show improved wetting properties with respect to adherends, small temporal changes in adhesion, and excellent re-workability. If the amount of the acrylic diblock copolymer (II) exceeds 25% by mass, the cohesion of the pressure-sensitive adhesives is lowered to deteriorate durability (the bonding may not be maintained for long periods).

In the acrylic diblock copolymer (II), the alkyl methacrylate polymer block C preferably has a glass transition temperature of not less than 50° C. and the alkyl acrylate polymer block D preferably has a glass transition temperature of not more than −20° C.

It is preferable that the polymer block C in the acrylic diblock copolymer (II) is compatible with the polymer blocks A in the acrylic triblock copolymer (I) that is base material of the pressure-sensitive adhesive. It is also preferable that the polymer block D in the acrylic diblock copolymer (II) is compatible with the polymer block B in the acrylic triblock copolymer (I).

In the above cases, the polymer block C in the acrylic diblock copolymer (II) is constrained to the constraint phases formed by the polymer blocks A1 and A2 in the acrylic triblock copolymer (I), whereby the lowering in cohesion is prevented. Moreover, the polymer block D in the acrylic diblock copolymer (II) exists in the non-constraint phase formed by the polymer block B in the acrylic triblock copolymer (I) and gives improved wetting properties at interfaces with adherends in the bonding process, providing stable bond strength immediately after lamination.

Examples of the alkyl methacrylate units constituting the polymer block C in the acrylic diblock copolymer (II) include alkyl methacrylate units such as methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate and isobornyl methacrylate. The polymer block C may be composed of a single or two or more kinds of the alkyl methacrylate units. In particular, it is preferable that the polymer block C contains poly(methyl methacrylate) because methyl methacrylate that is raw material is easily obtained at low costs and poly(methyl methacrylate) possesses excellent durability and weather resistance.

Examples of the alkyl acrylate units constituting the polymer block D in the acrylic diblock copolymer (II) include alkyl acrylate units such as methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate and stearyl acrylate. The polymer block D may be composed of a single or two or more kinds of the alkyl acrylate units.

It is particularly preferable that the polymer block D is composed of a single or two or more kinds of propyl acrylate, n-butyl acrylate, 2-ethylhexyl acrylate and n-octyl acrylate units. In this case, the glass transition temperature of the polymer block D is not more than −20° C. and the pressure-sensitive adhesives show good adhesion and tackiness at low temperatures and permit high-speed peeling without zipping phenomena. Of the above monomers, n-butyl acrylate and 2-ethylhexyl acrylate are general inexpensive chemicals.

The polymer block C and the polymer block D constituting the acrylic diblock copolymer (II) may contain small amounts of other monomer units (generally not more than 10% by mass based on the mass of each polymer block) while still achieving the advantages of the invention. Examples of the monomer units which may be found in the polymer blocks C and D include units composed of (meth)acrylates having functional groups such as methoxyethyl(meth)acrylate, ethoxyethyl(meth)acrylate, diethylaminoethyl(meth)acrylate, 2-hydroxyethyl (meth)acrylate, 2-aminoethyl(meth) acrylate, glycidyl (meth)acrylate and tetrahydrofurfuryl (meth)acrylate; units composed of carboxyvinyl monomers such as (meth)acrylic acid, crotonic acid, maleic acid, maleic anhydride, fumaric acid and (meth) acrylamide; units composed of aromatic vinyl monomers such as styrene, α-methylstyrene and p-methylstyrene; units composed of conjugated diene monomers such as butadiene and isoprene; units composed of olefin monomers such as ethylene and propylene; and units composed of lactone monomers such as ε-caprolactone and valerolactone. The polymer blocks may contain a single or two or more kinds of these monomer units as required.

The acrylic diblock copolymer (II) contains the polymer block D at 50 to 95% by mass (Requirement (F2)), and preferably 70 to 95% by mass based on the mass of the acrylic diblock copolymer (II).

This proportion of the polymer block B in the acrylic triblock copolymer (I) leads to stable adhesion of the pressure-sensitive adhesives.

If the proportion of the polymer block B in the acrylic triblock copolymer (I) is less than 50% by mass, the adhesion of the obtainable pressure-sensitive adhesives is lowered. If the proportion exceeds 95% by mass, the proportion of the polymer block C that provides pseudo crosslinking sites is relatively reduced to cause lower cohesion, possibly resulting in deteriorated durability of the pressure-sensitive adhesives.

The weight average molecular weight (Mw) of the acrylic diblock copolymer (II) is in the range of 50,000 to 300,000 (Requirement (F3)). From the viewpoints of durability and re-workability, the weight average molecular weight is preferably in the range of 60,000 to 250,000, and more preferably 70,000 to 200,000.

If the weight average molecular weight (Mw) of the acrylic diblock copolymer (II) is less than 50,000, the cohesion of the pressure-sensitive adhesives is insufficient to cause deteriorated durability such that optical films bonded to adherends, or protection films attached to optical films through the pressure-sensitive adhesives containing the acrylic triblock copolymer (I) and the acrylic diblock copolymer (II) are easily separated. If the weight average molecular weight (Mw) of the acrylic diblock copolymer (II) is more than 300,000, wetting properties are lowered and the adhesion is gradually increased during, for example, storage of products. Consequently, re-workability is deteriorated to make it difficult to remove and re-bond optical films or protection films in the event of wrinkles, air trap, entrapment of foreign substances or misalignment.

The molecular weight distribution (Mw/Mn) of the acrylic diblock copolymer (II) is in the range of 1.0 to 1.5 (Requirement (F4)). To achieve higher cohesion and non-contaminating properties for adherends (no adhesive transfer, no attachment of low-molecular weight components), the molecular weight distribution (Mw/Mn) is preferably in the range of 1.0 to 1.4, and more preferably 1.0 to 1.3.

Processes for producing the acrylic triblock copolymers (I) and the acrylic diblock copolymers (II) for use in the pressure-sensitive adhesives of the present invention are not particularly limited and may be conventional as long as the acrylic triblock copolymers and the acrylic diblock copolymers satisfy the aforementioned requirements. In general, living polymerization of monomers is adopted to obtain block copolymers having a narrow molecular weight distribution. Exemplary techniques of living polymerization include: polymerization using an organic rare earth metal complex as a polymerization initiator (Patent Document 6); anionic polymerization in the presence of a mineral acid salt such as alkali metal or alkaline earth metal salt using an organic alkali metal compound as a polymerization initiator (Patent Document 7);

anionic polymerization in the presence of an organoaluminum compound using an organic alkali metal compound as a polymerization initiator (Patent Document 8); and atom transfer radical polymerization (ATRP) (Non-Patent Document 1).

Of the above production processes, anionic polymerization in the presence of an organoaluminum compound has the following advantages. The compound is hardly deactivated during polymerization and therefore contamination with homopolymers that are deactivation products is small, resulting in high transparency of the obtainable pressure-sensitive adhesives. Further, the monomer conversion into polymer is high, namely, the amounts of residual monomers in the products are small, and consequently the use of the obtainable pressure-sensitive adhesive for bonding optical films prevents the generation of bubbles after lamination. Furthermore, the polymerization provides methacrylate polymer blocks having a highly syndiotactic molecular structure and the pressure-sensitive adhesives can bond optical films with high durability. The living polymerization can be performed under relatively mild temperature conditions, and the industrial production involves small environmental burdens (mainly electricity for refrigerating machines to control the polymerization temperature). Because of these advantages, it is preferable that the acrylic triblock copolymers (I) and the acrylic diblock copolymers (II) are produced by anionic polymerization in the presence of an organoaluminum compound.

In an exemplary anionic polymerization process in the presence of an organoaluminum compound, (meth)acrylate is polymerized in the presence of an organolithium compound and an organoaluminum compound represented by Formula (III) below:

$$AlR^1R^2R^3 \qquad (III)$$

wherein $R^1$, $R^2$ and $R^3$ are each independently an optionally substituted alkyl group, an optionally substituted cycloalkyl group, an optionally substituted aryl group, an optionally substituted aralkyl group, an optionally substituted alkoxyl group, an optionally substituted aryloxy group or an N,N-disubstituted amino group; or $R^1$ is any of the foregoing groups and $R^2$ and $R^3$ together form an optionally substituted arylenedioxy group. Where necessary, there may be added to the reaction system ether compounds such as dimethyl ether, dimethoxyethane, diethoxyethane and 12-crown-4, or nitrogen-containing compounds such as triethylamine, N,N,N',N'-tetramethylethylenediamine, N,N,N',N'',N''-pentamethyldiethylenetriamine, 1,1,4,7,10,10-hexamethyltriethylenetetramine, pyridine and 2,2'-dipyridyl.

Examples of the organolithium compounds include alkyllithiums and alkyldilithiums such as methyllithium, ethyllithium, n-propyllithium, isopropyllithium, n-butyllithium, sec-butyllithium, isobutyllithium, tert-butyllithium, n-pentyllithium, n-hexyllithium, tetramethylenedilithium, pentamethylenedilithium and hexamethylenedilithium; aryllithiums and aryldilithiums such as phenyllithium, m-tolyllithium, p-tolyllithium, xylyllithium and lithium naphthalene; aralkyllithiums and aralkyldilithiums such as benzyllithium, diphenylmethyllithium, trityllithium, 1,1-diphenyl-3-methylpentyllithium, α-methylstyryllithium, and dilithium from reaction between diisopropenylbenzene and butyllithium; lithiumamides such as lithiumdimethylamide, lithiumdiethylamide and lithiumdiisopropylamide; and lithium alkoxides such as methoxylithium, ethoxylithium, n-propoxylithium, isopropoxylithium, n-butoxylithium, sec-butoxylithium, tert-butoxylithium, pentyloxylithium, hexyloxylithium, heptyloxylithium, octyloxylithium, phenoxylithium, 4-methylphenoxylithium, benzyloxylithium and 4-methylbenzyloxylithium. These compounds may be used singly, or two or more kinds may be used in combination.

Examples of the organoaluminum compounds represented by Formula (III) include trialkylaluminums such as trimethylaluminum, triethylaluminum, tri-n-butylaluminum, tri-s-butylaluminum, tri-t-butylaluminum, triisobutylaluminum, tri-n-hexylaluminum, tri-n-octylaluminum, tri-2-ethylhexylaluminum and triphenylaluminum; dialkylphenoxyaluminums such as dimethyl(2,6-di-tert-butyl-4-methylphenoxy)aluminum, dimethyl(2,6-di-tert-butylphenoxy)aluminum, diethyl(2,6-di-tert-butyl-4-methylphenoxy)aluminum, diethyl(2,6-di-tert-butylphenoxy)aluminum, diisobutyl(2,6-di-tert-butyl-4-methylphenoxy)aluminum, diisobutyl(2,6-di-tert-butylphenoxy)aluminum, di-n-octyl(2,6-di-tert-butyl-4-methylphenoxy)aluminum and di-n-octyl(2,6-di-tert-butylphenoxy)aluminum; alkyldiphenoxyaluminums such as methylbis(2,6-di-tert-butyl-4-methylphenoxy)aluminum, methylbis(2,6-di-tert-butylphenoxy)aluminum, ethyl[2,2'-methylenebis(4-methyl-6-tert-butylphenoxy)]aluminum, ethylbis(2,6-di-tert-butyl-4-methylphenoxy)aluminum, ethylbis(2,6-di-tert-butylphenoxy)aluminum, ethyl[2,2'-methylenebis(4-methyl-6-tert-butylphenoxy)]aluminum, isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum, n-octylbis(2,6-di-tert-butyl-4-methylphenoxy)aluminum, n-octylbis(2,6-di-tert-butylphenoxy)aluminum and n-octyl[2,2'-methylenebis(4-methyl-6-tert-butylphenoxy)]aluminum; alkoxydiphenoxyaluminums such as methoxybis(2,6-di-tert-butyl-4-methylphenoxy)aluminum, methoxybis(2,6-di-tert-butylphenoxy)aluminum, methoxy[2,2'-methylenebis(4-methyl-6-tert-butylphenoxy)]aluminum, ethoxybis(2,6-di-tert-butyl-4-methylphenoxy)aluminum, ethoxybis(2,6-di-tert-butylphenoxy)aluminum, ethoxy[2,2'-methylenebis(4-methyl-6-tert-butylphenoxy)]aluminum, isopropoxybis(2,6-di-tert-butyl-4-methylphenoxy)aluminum, isopropoxybis(2,6-di-tert-butylphenoxy)aluminum, isopropoxy[2,2'-methylenebis(4-methyl-6-tert-butylphenoxy)]aluminum, tert-butoxybis(2,6-di-tert-butyl-4-methylphenoxy)aluminum, tert-butoxybis(2,6-di-tert-butylphenoxy)aluminum and tert-butoxy[2,2'-methylenebis (4-methyl-6-tert-butylphenoxy)]aluminum; and triphenoxyaluminums such as tris(2,6-di-tert-butyl-4-methylphenoxy)aluminum and tris(2,6-diphenylphenoxy)aluminum. Of these organoaluminum compounds, isobutylbis(2,6-di-tert-butyl-4-methylphenoxy)aluminum, isobutylbis(2,6-di-tert-butylphenoxy)aluminum and isobutyl[2,2'-methylenebis(4-methyl-6-tert-butylphenoxy)]aluminum are particularly preferable because they are easily handled and can promote polymerization of acrylates under relatively mild temperature conditions without being deactivated. These compounds may be used singly, or two or more kinds may be used in combination.

The solids (components other than the organic solvents) in the pressure-sensitive adhesives of the invention may consist solely of the acrylic triblock copolymers (I) without any other components, or may consist of the acrylic triblock copolymers (I) and the acrylic diblock copolymers (II) optionally together with a single or two or more kinds of tackifier resins, plasticizers and other additives as required.

In the pressure-sensitive adhesives of the invention, the content of the acrylic triblock copolymers (I) is not less than 60% by mass based on the total mass of all the solids contained in the pressure-sensitive adhesive. When the pressure-sensitive adhesive contains solids other than the acrylic triblock copolymers (I), for example the acrylic diblock copolymers (II), tackifier resins, plasticizers and other additives, the total content of such other solids should be not more than 40% by mass, preferably not more than 25% by mass, and more preferably not more than 20% by mass based on the total mass of all the solids contained in the pressure-sensitive adhesive.

The use of tackifier resins in the pressure-sensitive adhesives of the invention facilitates controlling the tackiness, adhesion and holding power. Any conventional tackifier resins used in pressure-sensitive adhesives may be used, with examples including natural resins such as rosin resins and terpene resins; and synthetic resins such as petroleum resins, coumarone-indene resins, phenolic resins, xylene resins and styrene resins. These may be used singly, or two or more kinds may be used in combination.

Of the tackifier resins, terpene resins such as hydrogenated terpene resins and terpene phenol resins; rosin resins such as hydrogenated rosin esters, disproportionated rosin esters and polymerized rosins; petroleum resins such as C5/C9 petroleum resins and aromatic petroleum resins; and styrene resins such as $\alpha$-methylstyrene polymers and styrene/$\alpha$-methylstyrene copolymers are preferably used because of high compatibility with the acrylic triblock copolymers (I) and stable adhesion. These may be used singly, or two or more kinds may be used in combination.

To achieve high adhesion, the softening point of the tackifier resins is preferably in the range of 50 to 150° C.

The amount of the tackifier resins in the pressure-sensitive adhesives may be determined appropriately depending on the types of adherends or the like. However, an excessively large amount leads to lower cohesion and problems such as adhesive transfer are caused in the re-working. Accordingly, the amount is preferably not more than 25% by mass, more preferably not more than 20% by mass, and still more preferably not more than 10% by mass based on the total mass of all the solids contained in the pressure-sensitive adhesive.

Examples of the plasticizers optionally used in the pressure-sensitive adhesives include fatty acid esters, for example phthalates such as dibutyl phthalate, di-n-octyl phthalate, bis-2-ethylhexyl phthalate, di-n-decyl phthalate and diisodecyl phthalate, adipates such as bis-2-ethylhexyl adipate and di-n-octyl adipate, sebacates such as bis-2-ethylhexyl sebacate and di-n-butyl sebacate, and azelates such as bis-2-ethylhexyl azelate; paraffins such as chlorinated paraffin; glycols such as polypropylene glycol; epoxy high-molecular weight plasticizers such as epoxidized soybean oil and epoxidized linseed oil; phosphates such as trioctyl phosphate and triphenyl phosphate; phosphites such as triphenyl phosphite; ester oligomers such as esters between adipic acid and 1,3-butylene glycol; acrylic oligomers such as poly(n-butyl (meth)acrylate) and poly(2-ethylhexyl(meth)acrylate); polybutene; polyisobutylene; polyisoprene; process oils; and naphthene oils. These may be used singly, or two or more kinds may be used in combination.

The amount of the plasticizers in the pressure-sensitive adhesives is preferably not more than 25% by mass, and more preferably not more than 10% by mass based on the total mass of all the solids contained in the pressure-sensitive adhesive. An excessively large amount of the plasticizers leads to lower cohesion and tends to cause problems such as adhesive transfer in the re-working.

Examples of additives other than those described above that may be used in the pressure-sensitive adhesives of the invention as required include antioxidants and UV absorbents to improve weather resistance, heat resistance and oxidation resistance; inorganic powder fillers such as calcium carbonate, titanium oxide, mica and talc; and fibrous fillers such as glass fibers and organic reinforcing fibers. Silane-coupling agents may be added to increase adhesion with glass at high humidity. Further, light-diffusing agents, near infrared absorbents, colorants, antistatic agents and conductive additives may be used to give desired functions to the pressure-sensitive adhesives.

In order that the pressure-sensitive adhesives can follow changes such as deformation, swelling and shrinkage of substrates or adherends and thereby reduce the stress to the substrates or adherends to exhibit stable adhesion and durability over long periods, it is preferable that when the dynamic viscoelasticity of the pressure-sensitive adhesive is measured at a frequency of 6.28 rad/s, the storage elastic modulus at 23° C. [G' (23° C.)] is in the range of $1.0\times10^5$ to $8.0\times10^5$ Pa and the storage elastic modulus at 90° C. [G' (90° C.)] is in the range of $7.0\times10^4$ to $6.0\times10^5$ Pa. More preferably, the storage elastic modulus [G' (23° C.)] is in the range of $2.0\times10^5$ to $8.0\times10^5$ Pa and the storage elastic modulus [G' (90° C.)] is in the range of $8.0\times10^4$ to $5.5\times10^5$ Pa. Still more preferably, the storage elastic modulus [G' (23° C.)] is in the range of $4.0\times10^5$ to $8.0\times10^5$ Pa and the storage elastic modulus [G' (90° C.)] is in the range of $2.0\times10^5$ to $5.5\times10^5$ Pa.

In the measurement of the dynamic viscoelasticity at a frequency of 6.28 rad/s, the storage elastic modulus at 23° C. [G' (23° C.)] and the storage elastic modulus at 90° C. [G' (90° C.)] are determined by methods as described in the working examples of the present invention.

The storage elastic modulus [G' (23° C.)] and the storage elastic modulus [G' (90° C.)] in the above ranges may be obtained easily and smoothly by controlling the weight average molecular weight (Mw) of the acrylic triblock copolymer (I), the mass % of the polymer block B, the kinds of monomer units and the amount of additives (e.g., tackifier resins, plasticizers).

The dynamic viscoelasticity of the pressure-sensitive adhesives may be optimized by using plural acrylic triblock copolymers (I) and controlling the proportions of the polymers. Accordingly, pressure-sensitive adhesives designed for various optical film substrates may be manufactured easily. Furthermore, variations attributed to raw materials may be adjusted by fine control of proportions of the components in the preparation of the pressure-sensitive adhesives, thereby achieving very stable quality.

Plastic materials used for optical films include polyethylene terephthalates (PET), triacetyl celluloses (TAC), polyvinyl alcohols (PVA), polycarbonates, cycloolefin resins, styrene/methyl methacrylate copolymer resins (MS resins), acrylic resins and acrylic UV resins. These materials are selectively used according to desired functions of optical films. For example, polarizing plates are usually PVA films on which a dichroic pigment (mainly iodine) is adsorbed and oriented. Because PVA films alone are poor in strength, TAC films as protection films are generally laminated on both sides thereof to prevent expansion or shrinkage under hot/humid or hot environment. In the case of polarizing plates with retardation functions, the TAC protection films are coated with a discotic liquid crystal; alternatively, retardation films obtained by stretching polycarbonates or cycloolefin resins are used instead of the TAC protection films. Prism sheets are PET films on which prisms are formed from acrylic UV resins or the like. Diffusion plates contain MS resins or polycarbonates. Diffusion films are PET films or polycarbonate films wherein the surface is coated with a bead layer, is surface-processed, or contains an internal diffuser. Light guide plates are manufactured by processing the surface of acrylic plates by special technique such that the light incident through lateral surfaces is reflected to give uniform surface emission, and reflecting PET sheets are used in lower part of the light guide plates.

Image display devices are generally composed of laminates of a plurality of the above optical films. Pressure-sensitive adhesives for bonding the optical films to glass substrates or the like or for attaching differing optical films together are required to achieve bonding while following the difference in thermal expansion coefficient (dimensional change by increasing temperature) between the optical film and glass substrate or the difference in thermal expansion coefficient (dimensional change by increasing temperature) between the differing optical films. Of the optical films, polarizing plates in particular are often shrunk greatly under hot conditions because the thermal stress to the stretched PVA causes the polarizing plate to revert to the original state (before the stretching). Therefore, pressure-sensitive adhesives for bonding the polarizing plates to liquid crystal cells or for attaching other optical films to the polarizing plates are required to follow dimensional change by relaxing the stress. Stress to the polarizing plates causes stress birefringence (phase difference). Such polarizing plates mounted on liquid crystal displays can cause problems such as optical unevenness (leakage of white light from the periphery of the screen in the black background of the liquid crystal display). The optical unevenness can be generally reduced by increasing the followability of the pressure-sensitive adhesives to dimensional change.

The pressure-sensitive adhesives of the invention may be pressure-sensitive adhesive solutions or solid pressure-sensitive adhesives.

The pressure-sensitive adhesive solutions may be prepared by dissolving the acrylic triblock copolymers (I) and optionally other components (e.g., the acrylic diblock copolymers (II), tackifier resins, plasticizers, other additives) in an organic solvent such as toluene, ethyl acetate, butyl acetate or methyl ethyl ketone, at relatively low temperatures (generally about 0 to 70° C.).

The solid pressure-sensitive adhesives may be produced by mixing at temperatures of 100 to 250° C. using a known kneading apparatus such as a kneader ruder, an extruder, a mixing roll or a Banbury mixer.

The pressure-sensitive adhesives of the invention are preferably used as pressure-sensitive adhesive solutions. The solutions can form a thin pressure-sensitive adhesive layer in a uniform thickness on a substrate or an adherend without high-temperature heating while preventing deformation, alteration in properties, orientation or residual stress in the substrate or the adherend.

The pressure-sensitive adhesives of the invention that are based on the acrylic triblock copolymer (I) can be dissolved in organic solvents at high solid concentrations while still ensuring low solution viscosity. When the pressure-sensitive adhesive is dissolved in toluene with a solid concentration of 45% by mass, the solution viscosity as measured with Brookfield viscometer at 25° C. is preferably in the range of 1000 to 4000 mPa·s, more preferably 1500 to 3500 mPa·s, and still more preferably 2000 to 3500 mPa·s. That is, the pressure-sensitive adhesives of the invention can give pressure-sensitive adhesive solutions having a higher solid concentration (not less than 35% by mass) than heretofore possible while the usage amount of organic solvents is reduced. The pressure-sensitive adhesive solutions of high solid concentration have excellent handling properties during application as well as process advantages (reduction of drying burden, increased application speed, elimination of the curing step) in spite of the high solid concentration.

From the viewpoints of application properties and handling properties of the pressure-sensitive adhesive solutions as well as process advantages, the pressure-sensitive adhesive solutions preferably have a total solid content of 30 to 60% by mass, and particularly 35 to 55% by mass based on the mass of the pressure-sensitive adhesive solution wherein the total solid content includes the acrylic triblock copolymers (I) and the optionally used acrylic diblock copolymers (II), tackifier resins, plasticizers and other additives.

As described hereinabove, the pressure-sensitive adhesives for optical films are non-chemical crosslinking pressure-sensitive adhesives.

As used herein, the words "non-chemical crosslinking" mean that the polymers that are components in the pressure-sensitive adhesives do not undergo chemical crosslinking reaction forming covalent bonds during production steps for pressure-sensitive adhesive products (such as storage step, application step, drying step, aging step and transportation step for the pressure-sensitive adhesives).

Acrylic polymers used in conventional acrylic pressure-sensitive adhesives for optical films are copolymers of acrylic acid, methacrylic acid, 2-hydroxyethyl acrylate, 6-hydroxyhexyl acrylate and the like as described in Patent Documents 1 to 3 and have reactive groups such as carboxyl groups or hydroxyl groups. The conventional acrylic pressure-sensitive adhesives for optical films cannot achieve desired cohesion by the acrylic polymers alone. Therefore, polyfunctional crosslinking agents (e.g., isocyanate compounds, epoxy compounds, ethyleneimine compounds) are generally used to react with the reactive groups in the polymers and crosslink the polymers during production steps for pressure-sensitive adhesive products, providing desired cohesion.

The pressure-sensitive adhesives for optical films according to the present invention exhibit sufficient bonding performance and durability without chemical crosslinking in contrast to the conventional acrylic pressure-sensitive adhesives for optical films, because the polymer blocks A1 and A2 form pseudo physical crosslinks in the acrylic triblock copolymer (I) that is the base material of the pressure-sensitive adhesive.

Because the pressure-sensitive adhesives do not entail chemical crosslinking, the production steps for pressure-sensitive adhesive products can save the time required for chemical crosslinking reaction, thus greatly improving productivity. Further because the pressure-sensitive adhesives do not involve the use of crosslinking agents and are free from reactive functional groups, excellent storage stability is obtained, permitting long-term storage or recovery and reuse of the pressure-sensitive adhesive that remains in a pressure-sensitive adhesive tank in the manufacturing of pressure-sensitive adhesive optical films.

Conventional crosslinking acrylic pressure-sensitive adhesives are mainly two-pack types containing a main agent and a crosslinking agent. After the two agents are mixed together, crosslinking reaction proceeds even at room temperature and adhesion properties or application properties are varied unless the adhesive is used immediately after the mixing.

Further, the crosslinking reaction of the conventional acrylic pressure-sensitive adhesives for optical films takes place during the drying step or storage of products, and uneven crosslinking is caused by drying conditions (e.g., temperature, air volume, line speed) or storage conditions (e.g., storage periods, temperature), resulting in varied bonding performance of the products. In contrast, the non-chemical crosslinking pressure-sensitive adhesives of the invention do not cause such problems.

Optical films or optical film protection films having the pressure-sensitive adhesives of the invention show small temporal increase of adhesion because the pressure-sensitive adhesives are of non-chemical crosslinking type. Therefore, these films can be released easily without adhesive transfer even after attached on adherends for long periods.

The conventional crosslinking acrylic pressure-sensitive adhesives entail strict water content control of pressure-sensitive adhesive solutions because crosslinking agents such as isocyanates are reactive with water. In the case of optical polarizing plates, water or alcohol often remains in the polarizing plates and can react with the crosslinking agents in the crosslinking acrylic pressure-sensitive adhesives. Accordingly, the pressure-sensitive adhesives are not crosslinked stably and unstable adhesion properties result. In contrast, the pressure-sensitive adhesives for optical films according to the present invention do not entail crosslinking agents and thus do not require strict control of water content in pressure-sensitive adhesive solutions or optical film substrates, enabling high stability of product quality.

By using the pressure-sensitive adhesives of the invention, there may be obtained pressure-sensitive adhesive optical films or optical film-protection pressure-sensitive adhesive films having a pressure-sensitive adhesive layer that is not chemically crosslinked.

The pressure-sensitive adhesive optical films or optical film-protection pressure-sensitive adhesive films with a pressure-sensitive adhesive layer of the present invention have at least one pressure-sensitive adhesive layer formed from the foregoing pressure-sensitive adhesive on a part or the whole of one or both surfaces of various kinds of optical films used in image display devices such as liquid crystal display devices, PDP, organic EL display devices and electronic papers, or protection films for such optical films. The pressure-sensitive adhesive optical films or optical film-protection pressure-sensitive adhesive films may be produced without a crosslinking step. The optical films used herein include polarizing films, polarizing plates, retardation films, view angle enlarging films, brightness increasing films, antireflection films, anti-glare films, color filters, light guide plates, diffusion films, prism sheets, electromagnetic wave shielding films, near infrared absorption films, and functional composite optical films having plural optical functions. Exemplary optical film-protection films include films that are attached to the above various optical films for protective purposes.

The pressure-sensitive adhesive optical films or optical film-protection pressure-sensitive adhesive films having the pressure-sensitive adhesives of the invention may be produced by, for example, the following methods. (i) The pressure-sensitive adhesive is applied to the optical film or optical film-protection film. (ii) The pressure-sensitive adhesive is applied to a release film such as release-treated polyethylene terephthalate film, and the release film is laminated on the optical film or optical film-protection film to transfer the pressure-sensitive adhesive layer onto the optical film or optical film-protection film.

The pressure-sensitive adhesive optical films or optical film-protection pressure-sensitive adhesive films having the non-chemical crosslinking pressure-sensitive adhesives of the invention do not entail annealing or curing as required in the use of crosslinking acrylic pressure-sensitive adhesives and can be directly shipped as products attachable to liquid crystal panels or other adherends, thereby achieving excellent productivity.

The pressure-sensitive adhesive optical films or optical film-protection pressure-sensitive adhesive films having the pressure-sensitive adhesives of the invention show superior re-workability because the pressure-sensitive adhesives do not undergo temporal chemical crosslinking through functional groups and crosslinking agents and have only small temporal change in adhesion. The conventional acrylic pressure-sensitive adhesives containing crosslinking agents undergo chemical crosslinking reaction during storage of products and increase the adhesion, so that it is often difficult to re-work the pressure-sensitive adhesives.

In applications where re-workability is required, it is regarded that the 180° peeling bond strength at the re-working is preferably in the range of 0.05 to 20 N/25 mm. The peeling bond strength is more preferably 0.1 to 15 N/25 mm, and still more preferably 3 to 10 N/25 mm. The pressure-sensitive adhesives for optical films according to the present invention retain 180° peeling bond strength in the above preferred range even after heat treatment.

EXAMPLES

The present invention will be described in detail by examples hereinbelow without limiting the scope of the invention.

Acrylic triblock copolymers and acrylic diblock copolymer used in Examples and Comparative Examples were synthesized by the following synthetic examples using chemicals dried and purified by conventional methods.

The acrylic triblock copolymers and acrylic diblock copolymer synthesized were analyzed to determine the weight average-molecular weight (Mw), the number average molecular weight (Mn), the molecular weight distribution (Mw/Mn) and the composition (contents of poly(n-butyl acrylate) blocks in the acrylic triblock copolymers and the acrylic diblock copolymer) as described below. The syndiotacticity [stereoregularity (rr)] of poly(methyl methacrylate) blocks in the triblock copolymers was determined as described below. The glass transition temperature of the polymer blocks and the polymerization conversion of monomers were determined as described below. The pressure-sensitive adhesives were tested by the following methods to determine or evaluate the storage elastic modulus, viscosity of pressure-sensitive adhesive solutions, adhesion and adhesive transfer (adhesion and adhesive transfer in an initial stage after lamination, adhesion and adhesive transfer after heat treatment, adhesion and adhesive transfer after autoclave treatment, adhesion and adhesive transfer after autoclave treatment and heat treatment), holding power of pressure-sensitive adhesive optical films (creep test) and shear adhesion failure temperature (SAFT) of the pressure-sensitive adhesives.

(1) Weight Average Molecular Weight (Mw) and Number Average Molecular Weight (Mn) of Block Copolymers The block copolymers were dissolved in tetrahydrofuran, and the solutions were analyzed by gel permeation chromatography (GPC) with the following apparatus and under the following conditions to determine the weight average molecular weight (Mw) and number average molecular weight (Mn) of the acrylic triblock copolymers and the acrylic diblock copolymer.

Apparatus: gel permeation chromatograph HLC-8020 manufactured by TOSOH CORPORATION.

Columns: TSK gel GMHXL, G4000HXL and G5000HXL manufactured by TOSOH CORPORATION. The columns were connected in series.

Eluent: tetrahydrofuran
Eluent flow rate: 1.0 ml/min
Column temperature: 40° C.
Detecting method: differential refractive index (RI)
Calibration curve: prepared using polystyrene standards (2) Molecular Weight Distribution of Block Copolymers (Mw/Mn)

The weight average molecular weight (Mw) of the acrylic triblock copolymer or the acrylic diblock copolymer obtained in (1) above was divided by the number average molecular weight (Mn) to obtain the molecular weight distribution (Mw/Mn) of each of the acrylic triblock copolymers and the acrylic diblock copolymer.

(3) Composition of Block Copolymers

The acrylic triblock copolymers and the acrylic diblock copolymer were each dissolved in deuterated chloroform. The composition of the block copolymers (contents of poly (methyl methacrylate) blocks and poly(n-butyl acrylate) blocks in the acrylic triblock copolymers and the acrylic diblock copolymer) was determined by proton nuclear magnetic resonance ($^1$H-NMR) spectroscopy using a nuclear magnetic resonance apparatus (JNM-LA400) manufactured by JEOL, Ltd. and deuterated chloroform as solvent.

In the $^1$H-NMR spectrum obtained, signals near 3.6 ppm and 4.0 ppm were assigned to the ester group of methyl methacrylate unit (—O—$CH_3$) and the ester group of n-butyl acrylate unit (—O—$CH_2$—$CH_2$—$CH_2$—$CH_3$), respectively. The contents of the copolymer components were obtained from the integration ratio.

(4) Syndiotacticity [Stereoregularity (rr)] of Poly(Methyl Methacrylate) Blocks in Acrylic Triblock Copolymer The acrylic triblock copolymers were each dissolved in deuterated chloroform. The solutions were analyzed on a nuclear magnetic resonance apparatus (JNM-LA400) manufactured by JEOL, Ltd. to determine the syndiotacticity [stereoregularity (rr)] of the methyl methacrylate polymer blocks (polymer blocks A1 and A2) in the acrylic triblock copolymers.

In the $^{13}$C-NMR spectrum obtained, signals near 44.5 ppm, 44.8 ppm and 45.5 ppm were assigned to the quaternary carbon atoms in the poly(methyl methacrylate) blocks, corresponding to the stereoregularity rr, mr and mm, respectively. The stereoregularity rr was obtained from the integration ratio. The stereoregularity may be also measured by $^1$H-NMR. Examples and Comparative Examples of the present invention adopted $^{13}$C-NMR because it was difficult by $^1$H-NMR to separate signals assigned to poly(methyl methacrylate) and signals assigned to poly(n-butyl acrylate) in the block copolymers.

(5) Glass Transition Temperature (Tg) of Polymer Blocks

A DSC curve was recorded with a DSC apparatus (DSC-822) manufactured by METTLER-TOLEDO K.K. at a temperature increasing rate of 10° C./min. The extrapolated initial temperature (Tgi) was obtained as the glass transition temperature (Tg).

(6) Monomer Conversion into Polymer

A portion of a reaction liquid was collected after the completion of formation of the polymer blocks. The monomer conversion into polymer was determined by measuring the amounts of monomers remaining in the reaction liquid with the following apparatus and under the following conditions.

Apparatus: Gas chromatograph GC-14A manufactured by Shimadzu Corporation

Column: INERT CAP 1 manufactured by GL Sciences Inc., inner diameter 0.25 mm×length 60 m×membrane thickness (df) 0.4 μm Analysis conditions: injection 300° C., detector 300° C., 60° C. (held 0 min)→5° C./min 100° C. (held 0 min)→15° C./min→300° C. (held 2 min)

(7) Storage Elastic Modulus of Pressure-Sensitive Adhesives (i) Pressure-sensitive adhesives obtained in Examples and Comparative Examples were dissolved in toluene to give pressure-sensitive adhesive solutions having a solid concentration of 30% by mass. The solutions were each poured into a box made of release paper (a substrate). The solutions were air dried at room temperature for 24 hours and were vacuum dried at 60° C. for 24 hours, thereby producing sheets having a pressure-sensitive adhesive layer with a thickness of approximately 1 mm. The sheets were punched into 8 mm-diameter circles, and the substrate was removed. Test pieces were thus prepared.

(ii) The test pieces prepared in (i) were tested with the following apparatus and under the following conditions to determine the temperature dependency of dynamic viscoelasticity. The storage elastic moduli (G') at 23° C. and 90° C. were obtained as G' (23° C.) and G' (90° C.).

Apparatus: Advanced Rheometric Expansion System manufactured by Rheometric Scientific.

Parallel plate: 8 mm diameter
Frequency: 6.28 rad/s
Measurement temperature range: −50° C. to 250° C.
Temperature increasing rate: 3° C./min
Strain: 0.05% (−50° C. to −37° C.), 1.0% (−37° C. to −15° C.), 5.0% (−15° C. to 250° C.)

(8) Solution Viscosity of Pressure-Sensitive Adhesives

Pressure-sensitive adhesives obtained in Examples and Comparative Examples were dissolved in toluene to give pressure-sensitive adhesive solutions having a solid concentration of 45% by mass. The viscosity of the pressure-sensitive adhesive solutions at 25° C. was measured with Brookfield viscometer (BL viscometer manufactured by TOKYO KEIKI INC.).

(9) Adhesion and Adhesive Transfer of Pressure-Sensitive Adhesives (i) In Examples and Comparative Examples described later, pressure-sensitive adhesive optical films were prepared which were composed of release polyethylene terephthalate film/pressure-sensitive adhesive/polyethylene terephthalate film substrate (hereinafter, the optical films will be referred to as the pressure-sensitive adhesive optical films (α)). In Examples and Comparative Examples described later, pressure-sensitive adhesive optical films (polarizing plates) were prepared which were composed of release polyethylene terephthalate/pressure-sensitive adhesive/polarizing plate (hereinafter, the optical films will be referred to as the pressure-sensitive adhesive optical films (β)). These optical films were cut to 25 mm×200 mm=width×length to give test pieces. (In Examples and Comparative Examples, the pressure-sensitive adhesive optical films (α) and the pressure-sensitive adhesive optical films (β) may be collectively referred to as the pressure-sensitive adhesive optical films.)

(ii) Adhesion and Adhesive Transfer in Initial Stage after Lamination (No Heat Treatment)

(a) The release PET film on the surface of the test piece prepared in (i) was removed, and the pressure-sensitive adhesive optical film was attached to an adherend that was a glass or polycarbonate flat plate. A 2 kg roller was moved on the pressure-sensitive adhesive optical film two times back and forth at 10 mm/sec. The bonded unit was allowed to stand at 23° C., 50% RH and atmospheric pressure for 24 hours. The 180° peeling bond strength was measured in accordance with JIS Z 0237 at a peeling rate of 300 mm/min.

(b) After the 180° peeling bond strength test in (a), the glass or polycarbonate flat plate was visually observed for any adhesive transfer. When the pressure-sensitive adhesive remained, the adhesive transfer was evaluated as "Present".

When the pressure-sensitive adhesive did not remain and was completely removed, the adhesive transfer was evaluated as "None".

(iii) Adhesion and Adhesive Transfer after Heat Treatment (a) The release PET film on the surface of the test piece prepared in (i) was removed, and the pressure-sensitive adhesive optical film was attached to an adherend that was a glass or polycarbonate flat plate. A 2 kg roller was moved on the pressure-sensitive adhesive optical film two-times back and forth at 10 mm/sec. The bonded unit was heat treated in a hot air oven at 70° C. for 15 hours and was humidity-conditioned by being allowed to stand at 23° C., 50% RH and atmospheric pressure for 1 hour. The bond strength was measured by a 180° peeling test in accordance with JIS Z 0237 at a peeling rate of 300 mm/min.

(b) After the 180° peeling bond strength test in (a), the glass or polycarbonate flat plate was visually observed for any adhesive transfer. When the pressure-sensitive adhesive remained, the adhesive transfer was evaluated as "Present". When the pressure-sensitive adhesive did not remain and was completely removed, the adhesive transfer was evaluated as "None".

(iv) Adhesion and Adhesive Transfer after Autoclave Treatment (a) The release PET film on the surface of the test piece prepared in (i) was removed, and the pressure-sensitive adhesive optical film was attached to an adherend that was a glass or polycarbonate flat plate. A 2 kg roller was moved on the pressure-sensitive adhesive optical film two times back and forth at 10 mm/sec. The bonded unit was treated in an autoclave at 50° C. and 5 atm (0.5 MPa) for 15 minutes and was humidity-conditioned by being allowed to stand at 23° C., 50% RH and atmospheric pressure for 1 hour. The bond strength was measured by a 180° peeling test in accordance with JIS Z 0237 at a peeling rate of 300 mm/min.

(b) After the 180° peeling bond strength test in (a), the glass or polycarbonate flat plate was visually observed for any adhesive transfer. When the pressure-sensitive adhesive remained, the adhesive transfer was evaluated as "Present". When the pressure-sensitive adhesive did not remain and was completely removed, the adhesive transfer was evaluated as "None".

(v) Adhesion and Adhesive Transfer after Autoclave Treatment and Heat Treatment (a) The release PET film on the surface of the test piece prepared in (i) was removed, and the pressure-sensitive adhesive optical film was attached to an adherend that was a glass or polycarbonate flat plate. A 2 kg roller was moved on the pressure-sensitive adhesive optical film two times back and forth at 10 mm/sec. The bonded unit was treated in an autoclave at 50° C. and 5 atm (0.5 MPa) for 15 minutes and was heat treated in a hot air oven at 70° C. for 15 hours. The bonded unit was then humidity-conditioned by being allowed to stand at 23° C., 50% RH and atmospheric pressure for 1 hour. The bond strength was measured by a 180° peeling test in accordance with JIS Z 0237 at a peeling rate of 300 mm/min.

(b) After the 180° peeling bond strength test in (a), the glass or polycarbonate flat plate was visually observed for any adhesive transfer. When the pressure-sensitive adhesive remained, the adhesive transfer was evaluated as "Present". When the pressure-sensitive adhesive did not remain and was completely removed, the adhesive transfer was evaluated as "None".

(10) Test of Holding Power of Pressure-Sensitive Adhesive Optical Films (Creep Test)

(i) The pressure-sensitive adhesive optical films (α) (the release PET film/pressure-sensitive adhesive/PET film substrate laminates) and the pressure-sensitive adhesive optical films (β) (the release PET film/pressure-sensitive adhesive/polarizing plate laminates) prepared in Examples and Comparative Examples described later were cut to 25 mm width and 40 mm length to give test pieces.

(ii) The release PET film was removed from the surface of the test piece prepared in (i) other than a planned weight attachment area, and the test piece was bonded to an adherend that was a glass or polycarbonate flat plate such that the bonded region ranged 25 mm in lateral direction (a direction perpendicular to the loading direction) and 10 mm in longitudinal direction (a direction identical with the loading direction). A 1 kg weight was attached to the test piece, and the creep of the test piece was measured at 90° C. after 30 minutes, 60 minutes and 1000 minutes in accordance with JIS Z 0237. The test also measured the time required until the test piece was removed from the glass or polycarbonate flat plate and the weight fell.

The durability (adhesion retention) of the pressure-sensitive adhesives was rated based on the criteria shown in Table 1 below.

This test evaluated durability of the pressure-sensitive adhesives. No creep of the test pieces and longer time until the falling of the test pieces indicate excellent durability of the pressure-sensitive adhesives.

TABLE 1

| | [Evaluation criteria in creep test] |
|---|---|
| Rate | Evaluation criteria |
| 5 | Excellent durability. Test piece did not creep in 60 minutes after weight was attached. Test piece crept not more than 0.1 mm but did not fall after 1000 minutes. |
| 4 | Very good durability. Test piece did not creep in 60 minutes after weight was attached. Test piece crept more than 0.1 mm but did not fall after 1000 minutes. |
| 3 | Good durability. Test piece did not creep in 60 minutes after weight was attached. Test piece fell in more than 60 minutes and less than 1000 minutes. |
| 2 | Poor durability. Test piece fell in between 30 and 60 minutes after weight was attached. |
| 1 | Bad durability. Test piece fell in less than 30 minutes after weight was attached. |

(11) Shear Adhesion Failure Temperature (SAFT) of Pressure-Sensitive Adhesives

The shear adhesion failure temperature was measured in accordance with ASTM D 4498.

The pressure-sensitive adhesive optical films (α) (the release PET film/pressure-sensitive adhesive/PET film substrate laminates) and the pressure-sensitive adhesive optical films (β) (the release PET film/pressure-sensitive adhesive/polarizing plate laminates) prepared in Examples and Comparative Examples described later were cut to 25 mm width and 60 mm length to give test pieces. The release PET film was removed from the surface of the test piece other than a planned weight attachment area, and the test piece was bonded to a glass plate such that the bonded region was a 25 mm×25 mm square. The bonded unit was stored at 25° C. and 50% RH for 24 hours and was placed in a 40° C. oven. A 500 g weight was attached to a central portion of one side of the test piece. The temperature in the oven was raised from 40° C.

to 220° C. at a temperature increasing rate of 0.5° C./min, and the temperature which caused detachment of the weight from the test piece was recorded.

This test evaluated durability and heat resistance of the pressure-sensitive adhesives. The higher the temperature causing the weight detachment, the higher the durability and heat resistance of the pressure-sensitive adhesives, indicating that the pressure-sensitive adhesives are suited for use under high-temperature conditions.

Synthetic Example 1

[Synthesis of Acrylic Triblock Copolymer (Ia-1)]

(1) A 2-liter three-necked flask was equipped with a three-way cock and was purged of the inside air with nitrogen. At room temperature, 868 g of toluene, 43.4 g of 1,2-dimethoxyethane and 60.0 g of a toluene solution which contained 40.2 mmol of isobutylbis(2,6-di-t-butyl-4-methylphenoxy) aluminum were added. Further, the flask was charged with 2.89 g of a cyclohexane/n-hexane mixture solution containing 5.00 mmol of sec-butyllithium and subsequently with 35.9 g of methyl methacrylate. The reaction liquid was yellow at first and became colorless after being stirred for 60 minutes at room temperature. The conversion of methyl methacrylate into polymer at this stage was at least 99.9%. The internal temperature of the polymerization liquid was lowered to −30° C., and 240 g of n-butyl acrylate was added dropwise over a period of 2 hours. After the completion of the dropwise addition, the mixture was stirred at −30° C. for 5 minutes. The conversion of n-butyl acrylate into polymer at this stage was at least 99.9%. Furthermore, 35.9 g of methyl methacrylate was added and the mixture was stirred at room temperature overnight, and the polymerization reaction was terminated by adding 3.50 g of methanol. The conversion of methyl methacrylate into polymer at this stage was at least 99.9%. The resultant reaction liquid was poured into 15 kg of methanol, and a white precipitate was deposited. The white precipitate was filtered off and dried to afford 308 g of an acrylic triblock copolymer [acrylic triblock copolymer (Ia-1)]

(2) The acrylic triblock copolymer (Ia-1) obtained in (1) above was identified by the foregoing methods to be a poly (methyl methacrylate) (PMMA)-poly(n-butyl acrylate) (PnBA)-poly(methyl methacrylate) (PMMA) triblock copolymer, with a weight average molecular weight (Mw) of 73,000, a number average molecular weight (Mn) of 65,200, and a molecular weight distribution (Mw/Mn) of 1.12.

In the acrylic triblock copolymer (Ia-1), the mass percentages of the polymer blocks were PMMA (11.5% by mass), PnBA (77.0% by mass) and PMMA (11.5% by mass). The content of the PnBA block was 77.0% by mass.

In the acrylic triblock copolymer (Ia-1), the glass transition temperatures of the PMMA blocks and the PnBA block were 100.3° C. and −46.5° C., respectively.

The PMMA blocks had a syndiotacticity [stereoregularity (rr)] of 67.3%.

Synthetic Example 2

[Synthesis of Acrylic Triblock Copolymer (Ia-2)]

(1) A 2-liter three-necked flask was equipped with a three-way cock and was purged of the inside air with nitrogen. At room temperature, 868 g of toluene, 43.4 g of 1,2-dimethoxyethane and 60.0 g of a toluene solution which contained 40.2 mmol of isobutylbis(2,6-di-t-butyl-4-methylphenoxy) aluminum were added. Further, the flask was charged with 3.68 g of a cyclohexane/n-hexane mixture solution containing 6.37 mmol of sec-butyllithium and subsequently with 49.9 g of methyl methacrylate. The reaction liquid was yellow at first and became colorless after being stirred for 60 minutes at room temperature. The conversion of methyl methacrylate into polymer at this stage was at least 99.9%. The internal temperature of the polymerization liquid was lowered to −30° C., and 212 g of n-butyl acrylate was added dropwise over a period of 2 hours. After the completion of the dropwise addition, the mixture was stirred at −30° C. for 5 minutes. The conversion of n-butyl acrylate into polymer at this stage was at least 99.9%. Furthermore, 49.9 g of methyl methacrylate was added and the mixture was stirred at room temperature overnight, and the polymerization reaction was terminated by adding 3.50 g of methanol. The conversion of methyl methacrylate into polymer at this stage was at least 99.9%. The resultant reaction liquid was poured into 15 kg of methanol, and a white precipitate was deposited. The white precipitate was filtered off and dried to afford 310 g of a triblock copolymer [acrylic triblock copolymer (Ia-2)].

(2) The acrylic triblock copolymer (Ia-2) obtained in (1) above was identified by the foregoing methods to be a PMMA-PnBA-PMMA triblock copolymer, with a weight average molecular weight (Mw) of 63,000, a number average molecular weight (Mn) of 50,000, and a molecular weight distribution (Mw/Mn) of 1.26.

In the acrylic triblock copolymer (Ia-2), the mass percentages of the polymer blocks were PMMA (16.0% by mass), PnBA (68.0% by mass) and PMMA (16.0% by mass). The content of the PnBA block was 68.0% by mass.

In the acrylic triblock copolymer (Ia-2), the glass transition temperatures of the PMMA blocks and the PnBA block were 101.8° C. and −44.6° C., respectively.

The PMMA blocks had a syndiotacticity [stereoregularity (rr)] of 70.5%.

Synthetic Examples 3 to 6

[Synthesis of Acrylic Triblock Copolymers (Ia-3) and (Ib-1) to (Ib-3)]

The procedures of Example 1 (1) were repeated to produce acrylic triblock copolymers (Ia-3), (Ib-1), (Ib-2) and (Ib-3) having weight average molecular weights (Mw), molecular weight distributions (Mw/Mn), PnBA block contents, glass transition temperatures of the polymer blocks, and PMMA syndiotacticity as shown in Table 2.

Synthetic Example 7

[Synthesis of Acrylic Diblock Copolymer (IIa)]

(1) A 2-liter three-necked flask was equipped with a three-way cock and was purged of the inside air with nitrogen. At room temperature, 868 g of toluene, 43.4 g of 1,2-dimethoxyethane and 30.0 g of a toluene solution containing 20.1 mmol of isobutylbis(2,6-di-t-butyl-4-methylphenoxy) aluminum were added. Further, the flask was charged with 3.31 g of a cyclohexane/n-hexane mixture solution containing 4.30 mmol of sec-butyllithium and subsequently with 21.5 g of methyl methacrylate. The reaction liquid was yellow at first and became colorless after being stirred for 60 minutes at room temperature. The conversion of methyl methacrylate into polymer at this stage was at least 99.9%. The internal temperature of the polymerization liquid was lowered to −30° C., and 291 g of n-butyl acrylate was added dropwise over a period of 2 hours. After the completion of the dropwise addition, the mixture was stirred at −30° C. for 5 minutes. The polymerization reaction was terminated by adding 3.5 g of methanol. The conversion of n-butyl acrylate into polymer at this stage was at least 99.9%. The resultant reaction liquid was poured into kg of methanol, and a colorless oily matter was deposited. The oily matter was separated by decantation and dried to afford 295 g of an acrylic diblock copolymer [acrylic diblock copolymer (IIa)].

(2) The acrylic diblock copolymer (IIa) obtained in (1) above was identified by the foregoing methods to be a PMMA-PnBA diblock copolymer, with a weight average molecular weight (Mw) of 92,000, a number average molecular weight (Mn) of 76,000, and a molecular weight distribution (Mw/Mn) of 1.21.

In the acrylic diblock copolymer (IIa), the mass percentages of the polymer blocks were PMMA (6.9% by mass) and PnBA (93.1% by mass).

Table 2 below shows data of the acrylic triblock copolymers (Ia-1) to (Ia-3) and (Ib-1) to (Ib-3) from Synthetic Examples 1 to 6 and the acrylic diblock copolymer (IIa) from Synthetic Example 7.

TABLE 2

|  | Synth. Ex. 1 | Synth. Ex. 2 | Synth. Ex. 3 | Synth. Ex. 4 | Synth. Ex. 5 | Synth. Ex. 6 | Synth. Ex. 7 |
|---|---|---|---|---|---|---|---|
| [Block copolymer] Symbol | (Ia-1) | (Ia-2) | (Ia-3) | (Ib-1) | (Ib-2) | (Ib-3) | (IIa) |
| Kind | A1-B-A2 | A1-B-A2 | A1-B-A2 | A1-B-A2 | A1-B-A2 | A1-B-A2 | C-D |
| Structure[1] | S1 | S1 | S1 | S1 | S1 | S1 | S2 |
| Weight average molecular weight[2] | 73,000 | 63,000 | 99,000 | 116,000 | 161,000 | 132,000 | 92,000 |
| Molecular weight distribution[3] | 1.12 | 1.26 | 1.17 | 1.07 | 1.26 | 1.29 | 1.21 |
| PnBA block content[4] (mass %) | 77.0 | 68.0 | 77.0 | 78.5 | 70.0 | 68.6 | 93.1 |
| Tg of PMMA block (° C.) | 100.3 | 101.8 | 112.8 | 114.6 | 115.0 | 114.7 | — |
| Tg of PnBA block (° C.) | −46.5 | −44.6 | −44.9 | −45.8 | −46.1 | −46.0 | −46.6 |
| Stereoregularity (rr)[5] (%) | 67.3 | 70.5 | 77.3 | 72.6 | 73.0 | 72.7 | — |

[1]Structures of block copolymers S1: PMMA-PnBA-PMMA  S2: PMMA-PnBA
[2]Weight average molecular weight (Mw) of block copolymers
[3]Molecular weight distribution (Mw/Mn) of block copolymers
[4]PnBA block content in triblock copolymer A1-B-A2 or diblock copolymer C-D
[5]Syndiotacticity [stereoregularity (rr)] of PMMA blocks in triblock copolymer A1-B-A2

Example 1

(1) A pressure-sensitive adhesive for optical films was prepared from the acrylic triblock copolymer (Ia-1) alone obtained in Synthetic Example 1.

The storage elastic modulus [G' (23° C.)] and storage elastic modulus [G' (90° C.)] of the pressure-sensitive adhesive of Example 1 were measured by the aforementioned method, the results being shown in Table 3.

The solution viscosity of the pressure-sensitive adhesive of Example 1 was measured by the aforementioned method, the result being shown in Table 3.

(2) The acrylic triblock copolymer (Ia-1) was dissolved in toluene to give a pressure-sensitive adhesive solution having a solid concentration of 30% by mass. The solution was applied to a polyethylene terephthalate film (thickness: 50 μm) and was dried at 60° C. for 10 minutes. The surface of the pressure-sensitive adhesive was covered with a release polyethylene terephthalate film (thickness: 38 μm). A pressure-sensitive adhesive optical film (α) (release PET film/pressure-sensitive adhesive/PET substrate film) was thus prepared.

(3) The pressure-sensitive adhesive optical film (α) prepared in (2) was tested by the foregoing methods to determine or evaluate properties. The results are shown in Table 3.

Example 2

A pressure-sensitive adhesive for optical films was prepared by dissolving the acrylic triblock copolymer (Ia-2) from Synthetic Example 2 and the acrylic diblock copolymer (IIa) from Synthetic Example 7 with a mass ratio of 85:15 in toluene to a solid concentration of 45% by mass.

The storage elastic modulus [G' (23° C.)], storage elastic modulus [G' (90° C.)] and solution viscosity of the pressure-sensitive adhesive were measured by the aforementioned methods, the results being shown in Table 3.

(2) A pressure-sensitive adhesive optical film (α) (release PET film/pressure-sensitive adhesive/PET substrate film laminate) was fabricated in the same manner as in Example 1 (2), except that the pressure-sensitive adhesive obtained in (1) above was diluted with toluene to give a pressure-sensitive adhesive solution having a solid concentration of 30% by mass. Properties were measured or evaluated by the foregoing methods, the results being shown in Table 3.

Example 3

(1) A pressure-sensitive adhesive for optical films was prepared by dissolving the acrylic triblock copolymer (Ia-2) from Synthetic Example 2 and the acrylic diblock copolymer (IIa) from Synthetic Example 7 with a mass ratio of 85:15 in toluene to a solid concentration of 45% by mass.

The storage elastic modulus [G' (23° C.)], storage elastic modulus [G' (90° C.)] and solution viscosity of the pressure-sensitive adhesive were measured by the aforementioned methods, the results being shown in Table 3.

(2) The pressure-sensitive adhesive obtained in (1) was diluted with toluene to give a pressure-sensitive adhesive solution having a solid concentration of 30% by mass. The solution was applied to a release-treated polyethylene terephthalate film (thickness: 38 μm) and was dried at 60° C. for 10 minutes. The resultant release-treated polyethylene terephthalate film/pressure-sensitive adhesive layer film was attached to a commercially available polarizing plate with use of a laminator. Thus, a pressure-sensitive adhesive optical film (β) (release PET film/pressure-sensitive adhesive/polarizing plate laminate) was prepared.

(3) Properties of the pressure-sensitive adhesive optical film (β) fabricated in (2) above were measured or evaluated by the foregoing methods, the results being shown in Table 3.

Example 4

(1) A pressure-sensitive adhesive for optical films was prepared by dissolving the acrylic triblock copolymer (Ia-3) from Synthetic Example 3, the acrylic diblock copolymer (IIa) from Synthetic Example 7 and a tackifier resin (special rosin ester resin "KE 311" manufactured by Arakawa Chemical Industries, Ltd.) with a mass ratio of 85:5:10 in toluene to a solid concentration of 45% by mass.

The storage elastic modulus [G' (23° C.)], storage elastic modulus [G' (90° C.)] and solution viscosity of the pressure-sensitive adhesive were measured by the aforementioned methods, the results being shown in Table 3.

(2) A pressure-sensitive adhesive optical film (β) (release PET film/pressure-sensitive adhesive/polarizing plate laminate) was fabricated in the same manner as in Example 3 (2), except that the pressure-sensitive adhesive obtained in (1) above was used. Properties of the pressure-sensitive adhesive optical film were measured or evaluated by the foregoing methods, the results being shown in Table 3.

Comparative Example 1

(1) A pressure-sensitive adhesive for optical films was prepared by dissolving the acrylic triblock copolymer (Ia-1) from Synthetic Example 1, the acrylic diblock copolymer (IIa) from Synthetic Example 7 and a tackifier resin (special rosin ester resin "KE 311" manufactured by Arakawa Chemical Industries, Ltd.) with a mass ratio of 53:5:42 in toluene to a solid concentration of 45% by mass.

The storage elastic modulus [G' (23° C.)], storage elastic modulus [G' (90° C.)] and solution viscosity of the pressure-sensitive adhesive were measured by the aforementioned methods, the results being shown in Table 3.

(2) A pressure-sensitive adhesive optical film (β) was fabricated in the same manner as in Example 3 (2), except that the pressure-sensitive adhesive obtained in (1) above was used. Properties of the pressure-sensitive adhesive optical film were measured or evaluated by the foregoing methods, the results being shown in Table 3.

Examples 5-9 and Comparative Example 2

(1) Pressure-sensitive adhesives for optical films were prepared by dissolving one or two kinds of the acrylic triblock copolymers (Ia-1) (Ib-1) and (Ib-2) from Synthetic Examples 1, 4 and 5, and further dissolving the acrylic diblock copolymer (IIa) from Synthetic Example 7 with a mass ratio shown in Table 4 in toluene to a solid concentration of 45% by mass.

The storage elastic modulus [G' (23° C.)], storage elastic modulus [G' (90° C.)] and solution viscosity of the pressure-sensitive adhesives were measured by the aforementioned methods, the results being shown in Table 4.

(2) Pressure-sensitive adhesive optical films (β) (release PET film/pressure-sensitive adhesive/polarizing plate laminates) were fabricated in the same manner as in Example 3 (2), except that the respective pressure-sensitive adhesives obtained in (1) above were used. Properties of the pressure-sensitive adhesive optical films were measured or evaluated by the foregoing methods, the results being shown in Table 4.

Examples 10-13

(1) Pressure-sensitive adhesives for optical films were prepared by dissolving two or three kinds of the acrylic triblock copolymers (Ia-2) (Ib-1) and (Ib-3) from Synthetic Examples 2, 4 and 6 with a mass ratio shown in Table 5 in toluene to a solid concentration of 45% by mass.

The storage elastic modulus [G' (23° C.)], storage elastic modulus [G' (90° C.)] and solution viscosity of the pressure-sensitive adhesives were measured by the aforementioned methods, the results being shown in Table 5.

(2) Pressure-sensitive adhesive optical films (α) (release PET film/pressure-sensitive adhesive/PET substrate film laminates) were fabricated in the same manner as in Example 1 (2), except that the respective pressure-sensitive adhesives obtained in (1) above were used (Examples 10 and 12). Separately, pressure-sensitive adhesive optical films (β) (release PET film/pressure-sensitive adhesive/polarizing plate laminates) were fabricated in the same manner as in Example 3 (2), except that the respective pressure-sensitive adhesives obtained in (1) above were used (Examples 11 and 13). Properties of the pressure-sensitive adhesive optical films were measured or evaluated by the foregoing methods, the results being shown in Table 5.

TABLE 3

|  | Ex. 1 | Ex. 2 | Ex. 3 | Ex. 4 | Comp. Ex. 1 |
| --- | --- | --- | --- | --- | --- |
| [Composition of pressure-sensitive adhesive (parts by mass)] Acrylic triblock copolymers |  |  |  |  |  |
| (Ia-1) (Mw = 73,000) | 100 |  |  |  | 53 |
| (Ia-2) (Mw = 63,000) |  | 85 | 85 |  |  |
| (Ia-3) (Mw = 99,000) |  |  |  | 85 |  |
| Acrylic diblock copolymer (IIa) (Mw = 92,000) |  | 15 | 15 | 5 | 5 |
| Tackifier resin (KE311) |  |  |  | 10 | 42 |
| [Properties of pressure-sensitive adhesive and pressure-sensitive adhesive optical film] |  |  |  |  |  |
| Storage elastic modulus G' of pressure-sensitive adhesive (23° C.) | $3.15 \times 10^5$ | $6.12 \times 10^5$ | $6.12 \times 10^5$ | $2.29 \times 10^5$ | $2.93 \times 10^5$ |
| Storage elastic modulus G' of pressure-sensitive adhesive (90° C.) | $1.98 \times 10^5$ | $2.88 \times 10^5$ | $2.88 \times 10^5$ | $1.88 \times 10^5$ | $6.65 \times 10^4$ |

TABLE 3-continued

|  | Ex. 1 | Ex. 2 | Ex. 3 | Ex. 4 | Ex. 5 | Comp. Ex. 1 |
|---|---|---|---|---|---|---|
| Viscosity of pressure-sensitive adhesive solution[1] (mPa·s) | 1270 | 1230 | 1230 | 3850 | | 150 |
| Kinds of pressure-sensitive adhesive optical films[2] | α | α | β | β | | β |
| Thickness of pressure-sensitive adhesive layer (μm) | 25 | 25 | 25 | 25 | | 25 |
| Adhesion and adhesive transfer | | | | | | |
| Adherend | Glass plate | Glass plate | PC plate[3] | Glass plate | Glass plate | Glass plate |
| Initial stage after lamination | | | | | | |
| Adhesion (N/25 mm) | 6.5 | 4.7 | 5.8 | 0.4 | 4.1 | 29.0 |
| Adhesive transfer | None | None | None | None | None | Present |
| After heat treatment | | | | | | |
| Adhesion (N/25 mm) | 9.8 | 8.6 | 10.9 | 1.6 | 7.4 | 43.2 |
| Adhesive transfer | None | None | None | None | None | Present |
| Creep test | | | | | | |
| Adherend | Glass plate | Glass plate | PC plate[3] | Glass plate | Glass plate | Glass plate |
| Results (rate) | 4 | 4 | 4 | 3 | 3 | 1 |
| Weight falling time (time for separation of test piece) | Test piece crept 0.2 mm in 1000 min (did not fall). | Test piece crept 0.2 mm in 1000 min (did not fall). | Test piece crept 0.2 mm in 1000 min (did not fall). | 170 min. | 444 min. | 1 min. |
| SAFT test (°C.) | 152 | 158 | 158 | 158 | 151 | 121 |

[1] Viscosity of pressure-sensitive adhesive solution: toluene solution with 45% by mass solid concentration (25° C.)
[2] Kinds of pressure-sensitive adhesive optical films: α: pressure-sensitive adhesive optical film (α) (release PET film/pressure-sensitive adhesive/PET film substrate laminate) β: pressure-sensitive adhesive optical film (β) (release PET film/pressure-sensitive adhesive/polarizing plate laminate)
[3] PC plate: polycarbonate flat plate

TABLE 4

|  | Ex. 5 | Ex. 6 | Ex. 7 | Ex. 8 | Ex. 9 | Comp. Ex. 2 |
|---|---|---|---|---|---|---|
| [Composition of pressure-sensitive adhesive (parts by mass)] | | | | | | |
| Acrylic triblock copolymers | | | | | | |
| (Ia-2) (Mw = 63,000) | 90 | 80 | 45 | | | 50 |
| (Ib-1) (Mw = 116,000) | | | 45 | 90 | | |
| (Ib-2) (Mw = 161,000) | | | | | 85 | |
| Acrylic diblock copolymer (IIa) (Mw = 92,000) | 10 | 20 | 10 | 10 | 15 | 50 |
| [Properties of pressure-sensitive adhesive and pressure-sensitive adhesive optical film] | | | | | | |
| Storage elastic modulus G' of pressure-sensitive adhesive (23° C.) | $4.76 \times 10^5$ | $4.03 \times 10^5$ | $2.85 \times 10^5$ | $2.01 \times 10^5$ | $3.65 \times 10^5$ | $1.69 \times 10^5$ |
| Storage elastic modulus G' of pressure-sensitive adhesive (90° C.) | $2.75 \times 10^5$ | $2.01 \times 10^5$ | $1.74 \times 10^5$ | $1.20 \times 10^5$ | $1.74 \times 10^5$ | $6.71 \times 10^4$ |
| Viscosity of pressure-sensitive adhesive solution[1] (mPa·s) | 1410 | 1070 | 1960 | 3840 | More than 100000 | 570 |
| Kinds of pressure-sensitive adhesive optical films[2] | β | β | β | β | β | β |
| Thickness of pressure-sensitive adhesive layer (μm) | 22 | 24 | 33 | 22 | 20 | 24 |
| Adhesion and adhesive transfer | | | | | | |
| Adherend | Glass plate | Glass plate | Glass plate | Glass plate | Glass plate | Glass plate |

TABLE 4-continued

|  | Ex. 5 | Ex. 6 | Ex. 7 | Ex. 8 | Ex. 9 | Comp. Ex. 2 |
|---|---|---|---|---|---|---|
| After autoclave treatment |  |  |  |  |  |  |
| Adhesion (N/25 mm) | 3.0 | 16.1 | 11.2 | 3.3 | 1.9 | 25.0 |
| Adhesive transfer | None | None | None | None | None | Present |
| After autoclave treatment and heat treatment |  |  |  |  |  |  |
| Adhesion (N/25 mm) | 4.5 | 17.0 | 13.3 | 3.5 | 2.1 | 29.0 |
| Adhesive transfer | None | None | None | None | None | Present |
| Creep test |  |  |  |  |  |  |
| Adherend | Glass plate | Glass plate | Glass plate | Glass plate | Glass plate | Glass plate |
| Results (rate) | 3 | 3 | 4 | 4 | 4 | 1 |
| Weight falling time (time for separation of test piece) | 653 min. | 74 min. | Test piece crept 0.2 mm in 1000 min (did not fall). | Test piece crept 0.3 mm in 1000 min (did not fall). | Test piece crept 0.2 mm in 1000 min (did not fall). | 1 min. |
| SAFT test (° C.) | 162 | 156 | 163 | 164 | 213 | 125 |

[1] Viscosity of pressure-sensitive adhesive solution: toluene solution with 45% by mass solid concentration (25° C.)
[2] Kinds of pressure-sensitive adhesive optical films: β: pressure-sensitive adhesive optical film (β) (release PET film/pressure-sensitive adhesive/polarizing plate laminate)

TABLE 5

|  | Ex. 10 | Ex. 11 | Ex. 12 | Ex. 13 |
|---|---|---|---|---|
| [Composition of pressure-sensitive adhesive (parts by mass)] Acrylic triblock copolymers |  |  |  |  |
| (Ia-2) (Mw = 63,000) | 50 | 50 | 65 | 65 |
| (Ib-1) (Mw = 116,000) | 50 | 50 | 25 | 25 |
| (Ib-3) (Mw = 132,000) |  |  | 10 | 10 |
| [Properties of pressure-sensitive adhesive and pressure-sensitive adhesive optical film] |  |  |  |  |
| Storage elastic modulus G' of pressure-sensitive adhesive (23° C.) | $4.41 \times 10^5$ | $4.41 \times 10^5$ | $7.94 \times 10^5$ | $7.94 \times 10^5$ |
| Storage elastic modulus G' of pressure-sensitive adhesive (90° C.) | $2.71 \times 10^5$ | $2.71 \times 10^5$ | $5.03 \times 10^5$ | $5.03 \times 10^5$ |
| Viscosity of pressure-sensitive adhesive solution[1] (mPa·s) | 2410 | 2410 | 3220 | 3220 |
| Kinds of pressure-sensitive adhesive optical films[2] | α | β | α | β |
| Thickness of pressure-sensitive adhesive layer (μm) | 25 | 29 | 30 | 25 |
| Adhesion and adhesive transfer |  |  |  |  |
| Adherend | Glass plate | Glass plate | Glass plate | Glass plate |
| After autoclave treatment |  |  |  |  |
| Adhesion (N/25 mm) | 17.0 | 4.5 | 15.8 | 7.5 |
| Adhesive transfer | None | None | None | None |
| After autoclave treatment and heat treatment |  |  |  |  |
| Adhesion (N/25 mm) | 17.1 | 10.0 | 15.9 | 9.2 |
| Adhesive transfer | None | None | None | None |
| Creep test |  |  |  |  |
| Adherend | Glass plate | Glass plate | Glass plate | Glass plate |
| Results (rate) | 5 | 4 | 5 | 5 |

TABLE 5-continued

|  | Ex. 10 | Ex. 11 | Ex. 12 | Ex. 13 |
|---|---|---|---|---|
| Weight falling time (time for separation of test piece) | Test piece crept 0.1 mm in 1000 min (did not fall). | Test piece crept 0.2 mm in 1000 min (did not fall). | Test piece did not creep in 1000 min (did not fall). | Test piece crept 0.1 mm in 1000 min (did not fall). |
| SAFT test (° C.) | 166 | 166 | 174 | 174 |

[1])Viscosity of pressure-sensitive adhesive solution: toluene solution with 45% by mass solid concentration (25° C.)
[2])Kinds of pressure-sensitive adhesive optical films:
α: pressure-sensitive adhesive optical film (α) (release PET film/pressure-sensitive adhesive/PET film substrate laminate)
β: pressure-sensitive adhesive optical film (β) (release PET film/pressure-sensitive adhesive/polarizing plate laminate)

The results in Tables 3 to 5 will be discussed below. The pressure-sensitive adhesives for optical films from Examples 1 to 13 contained one, two or three kinds of the acrylic triblock copolymers (Ia-1) to (Ia-3) and (Ib-1) to (Ib-3) satisfying the requirements (E1) to (E4), at not less than 60% by mass based on the total mass of all the solids contained in the pressure-sensitive adhesive. As a result, the storage elastic modulus [G' (23° C.)] was in the range of $1.0 \times 10^5$ to $8.0 \times 10^5$ Pa, and the storage elastic modulus [G' (90° C.)] was in the range of $7.0 \times 10^4$ to $6.0 \times 10^5$ Pa. The pressure-sensitive adhesives exhibited excellent followability to changes such as deformation, swelling or shrinkage of substrates or adherends and achieved reduced stress to the substrates or adherends, showing high adhesion and durability stably over long periods.

The pressure-sensitive adhesive optical films (α) (release PET film/pressure-sensitive adhesive/PET substrate film laminates) and the pressure-sensitive adhesive optical films (β) (release PET film/pressure-sensitive adhesive/polarizing plate laminates) fabricated using the pressure-sensitive adhesives from Examples 1 to 13 showed appropriate adhesion (generally 0.05 to 20 N/25 mm) at an initial stage after lamination, after heat treatment, after autoclave treatment, and after autoclave treatment and heat treatment. They were removed cleanly without adhesive transfer and had excellent re-workability.

The creep test of the pressure-sensitive adhesives from Examples 1 to 13 demonstrated excellent durability with no creep or falling of the test pieces (sampled from the pressure-sensitive adhesive optical films (α) or (β)) bonded to the glass or polycarbonate flat plate even after 60 minutes. Further, the SAFT was 151° C. or higher. The pressure-sensitive adhesives were thus shown to have excellent durability and heat resistance.

The pressure-sensitive adhesives for optical films from Examples 7 and 10 to 13 contained the acrylic triblock copolymer (Ia) (the acrylic triblock copolymer (Ia-2)) with a weight average molecular weight (Mw) of not less than 50,000 to less than 100,000, and the acrylic triblock copolymer(s) (Ib) (the acrylic triblock copolymer (Ib-1) or copolymers (Ib-1) and (Ib-3)) with a weight average molecular weight (Mw) of 100,000 to 300,000, at acrylic triblock copolymer (Ia):acrylic triblock copolymer(s) (Ib)=45:55 to 75:25 (mass ratio). As a result, the pressure-sensitive adhesives showed excellent durability in the creep test, with no falling of the test pieces (sampled from the pressure-sensitive adhesive optical films (α) or (β)) bonded to the glass or polycarbonate flat plate even after 1000 minutes. Further, the SAFT was 163° C. or higher. The pressure-sensitive adhesives were thus demonstrated to have excellent durability and heat resistance.

In contrast, the pressure-sensitive adhesives for optical films from Comparative Examples 1 and 2 exhibited poor followability to changes such as deformation, swelling or shrinkage of substrates or adherends, because the content of the acrylic triblock copolymer (I) was less than 60% by mass based on the total mass of all the solids contained in the pressure-sensitive adhesive.

Furthermore, the pressure-sensitive adhesive polarizing plates (release PET/pressure-sensitive adhesive/polarizing plate laminates) having the pressure-sensitive adhesives of Comparative Examples 1 and 2 showed excessively high adhesion at an initial stage after lamination, after heat treatment, after autoclave treatment, and after autoclave treatment and heat treatment. They caused adhesive transfer when removed and had bad re-workability.

The creep test of the pressure-sensitive adhesives from Comparative Examples 1 and 2 demonstrated poor durability. The test pieces (sampled from the pressure-sensitive adhesive polarizing plates (release PET/pressure-sensitive adhesive/polarizing plate laminates) bonded to the glass or polycarbonate flat plate fell therefrom as early as after one minute. Further, the SAFT was low, being 121° C. or 125° C. The pressure-sensitive adhesives were thus shown to have poor durability and heat resistance.

INDUSTRIAL APPLICABILITY

The pressure-sensitive adhesives for optical films of the present invention are non-chemical crosslinking types and do not require chemical crosslinking. Even without chemical crosslinking, the pressure-sensitive adhesives exhibit high cohesion and excellent properties such as re-workability, adhesion properties, heat resistance and durability. Further, the pressure-sensitive adhesives can be dissolved in organic solvents at high concentrations while still ensuring low solution viscosity. Therefore, the pressure-sensitive adhesive solutions can have a higher solid concentration than heretofore possible while the usage amount of organic solvents is reduced. The decreased use of organic solvents reduces deterioration of work environment and environmental pollution and saves the time and heat energy required to remove the solvents after application.

According to an embodiment of the invention, the acrylic triblock copolymer (I) is a combination of the acrylic triblock copolymer (Ia) having a weight average molecular weight (Mw) of 50,000 to less than 100,000 and the acrylic triblock copolymer (Ib) having a weight average molecular weight (Mw) of 100,000 to 300,000, in a mass ratio of 45:55 to 75:25. The pressure-sensitive adhesives for optical films containing such acrylic triblock copolymers may be more easily and more smoothly controlled in properties such as adhesive properties (e.g., adhesion, creep) and bulk properties (e.g., dynamic viscoelasticity). Furthermore, such pressure-sensitive adhesives exhibit higher durability and heat resistance as well as still improved followability to substrate deformation, being extremely useful in the industry as pressure-sensitive adhesives for optical films.

The invention claimed is:

1. A pressure-sensitive adhesive for optical films that comprises an acrylic triblock copolymer (I) at not less than 60% by mass based on the total mass of all solids contained in the pressure-sensitive adhesive, the acrylic triblock copolymer meeting requirements (E1), (E2), (E3) and (E4):

(E1) the acrylic triblock copolymer is represented by Formula (1):

$$A1\text{-}B\text{-}A2 \quad (1)$$

wherein A1 and A2 are each independently an alkyl methacrylate polymer block having a glass transition temperature of not less than 100° C. and B is an alkyl acrylate polymer block having a glass transition temperature of not more than −20° C.;

(E2) the content of the polymer block B is 50 to 95% by mass;

(E3) the weight average molecular weight (Mw) is in the range of 50,000 to 300,000; and (E4) the molecular weight distribution (Mw/Mn) is in the range of 1.0 to 1.5 wherein the acrylic triblock copolymer (I) is a combination comprising an acrylic triblock copolymer (Ia) and an acrylic triblock copolymer (Ib) in a mass ratio (Ia):(Ib) of 45:55 to 75:25, the acrylic triblock copolymer (Ia) meeting requirements (E1), (E2), (E3') and (E4), the acrylic triblock copolymer (Ib) meeting requirements (E1), (E2), (E3") and (E4):

(E3') the weight average molecular weight (Mw) is in the range of 50,000 to less than 100,000; and (E3") the weight average molecular weight (Mw) is in the range of 100,000 to 300,000.

2. The pressure-sensitive adhesive for optical films according to claim 1, wherein the weight average molecular weight (Mw) of the acrylic triblock copolymer (Ib) is in the range of 100,000 to 200,000.

3. The pressure-sensitive adhesive for optical films according to claim 1, wherein the content of the polymer block B in the acrylic triblock copolymer (Ia) is 50 to 70% by mass and the content of the polymer block B in the acrylic triblock copolymer (Ib) is 65 to 95% by mass.

4. The pressure-sensitive adhesive for optical films according to claim 1, wherein the acrylic triblock copolymer (Ib) is a combination comprising an acrylic triblock copolymer (Ib-1) and an acrylic triblock copolymer (Ib-2) in a mass ratio (Ib-1):(Ib-2) of 10:90 to 90:10, the acrylic triblock copolymer (Ib-1) meeting requirements (E1), (E2) and (E4) and having a weight average molecular weight (Mw) of 100,000 to less than 120,000, the acrylic triblock copolymer (Ib-2) meeting requirements (E1), (E2) and (E4) and having a weight average molecular weight (Mw) of 120,000 to 200,000.

5. The pressure-sensitive adhesive for optical films according to claim 1, wherein the alkyl methacrylate polymer blocks A1 and A2 forming the acrylic triblock copolymer (I) have a syndiotacticity of not less than 65%.

6. The pressure-sensitive adhesive for optical films according to claim 1, wherein the pressure-sensitive adhesive further comprises an acrylic diblock copolymer (II) at 3 to 25% by mass based on the total mass of all solids contained in the pressure-sensitive adhesive, the acrylic diblock copolymer meeting requirements (F1), (F2), (F3) and (F4):

(F1) the acrylic diblock copolymer is represented by Formula (2):

$$C\text{-}D \quad (2)$$

wherein C is an alkyl methacrylate polymer block and D is an alkyl acrylate polymer block;

(F2) the content of the polymer block D is 50 to 95% by mass;

(F3) the weight average molecular weight (Mw) is in the range of 50,000 to 300,000; and (F4) the molecular weight distribution (Mw/Mn) is in the range of 1.0 to 1.5.

7. The pressure-sensitive adhesive for optical films according to claim 1, wherein when the dynamic viscoelasticity of the pressure-sensitive adhesive is measured at a frequency of 6.28 rad/s, the storage elastic modulus at 23° C. [G' (23° C.)] is in the range of $1.0\times10^5$ to $8.0\times10^5$ Pa and the storage elastic modulus at 90° C. [G' (90° C.)] is in the range of $7.0\times10^4$ to $6.0\times10^5$ Pa.

8. The pressure-sensitive adhesive for optical films according to claim 1, wherein the pressure-sensitive adhesive is a pressure-sensitive adhesive solution in an organic solvent.

9. The pressure-sensitive adhesive for optical films according to claim 1, wherein a solution of the pressure-sensitive adhesive in toluene with a solid concentration of 45% by mass has a solution viscosity of 1000 to 4000 mPa·s as measured with Brookfield viscometer at 25° C.

10. A pressure-sensitive adhesive optical film that comprises a pressure-sensitive adhesive layer formed from the pressure-sensitive adhesive of claim 1 and is produced without crosslinking.

11. An image display device comprising the pressure-sensitive adhesive optical film of claim 10.

12. An optical film-protection pressure-sensitive adhesive film that comprises a pressure-sensitive adhesive layer formed from the pressure-sensitive adhesive of claim 1 and is produced without crosslinking.

13. An image display device comprising the optical film-protection pressure-sensitive adhesive film of claim 12.

14. An image display device comprising the pressure-sensitive adhesive optical film of claim 10 and an optical film-protection pressure-sensitive adhesive film that comprises a pressure-sensitive adhesive layer formed from a pressure sensitive adhesive that comprises an acrylic triblock copolymer (I) at not less than 60% by mass based on the total mass of all solids contained in the pressure-sensitive adhesive.

15. The pressure-sensitive adhesive for optical films according to claim 1, wherein said alkyl methacryalte polymer blocks A1 and A2 forming at least one of the acrylic triblock copolymer (Ia) and the acrylic triblock copolymer (Ib) has a syndiotacticity of not less than 65%.

16. The pressure-sensitive adhesive for optical films according to claim 4, wherein said alkyl methacryalte polymer blocks A1 and A2 forming at least one of the acrylic triblock copolymer (Ib-1) and the acrylic triblock copolymer (Ib-2) has a syndiotacticity of not less than 65%.

17. The pressure-sensitive adhesive for optical films according to claim 1, wherein polymers which are components in said pressure-sensitive adhesive do not undergo a chemical crosslinking reaction forming covalent bonds during production steps for said pressure-sensitive adhesive.

* * * * *